(12) United States Patent
Kim

(10) Patent No.: US 10,826,875 B1
(45) Date of Patent: Nov. 3, 2020

(54) SYSTEM AND METHOD FOR SECURELY COMMUNICATING REQUESTS

(71) Applicant: ServiceNow, Inc., Santa Clara, CA (US)

(72) Inventor: John H. Kim, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 314 days.

(21) Appl. No.: 15/217,103

(22) Filed: Jul. 22, 2016

(51) Int. Cl.
*H04L 29/06* (2006.01)
*H04L 9/14* (2006.01)

(52) U.S. Cl.
CPC ............ *H04L 63/0428* (2013.01); *H04L 9/14* (2013.01); *H04L 63/061* (2013.01)

(58) Field of Classification Search
CPC ...... H04L 63/0428; H04L 63/061; H04L 9/14
USPC .......................................................... 713/171
See application file for complete search history.

(56) References Cited

U.S. PATENT DOCUMENTS

| | | | | |
|---|---|---|---|---|
| 5,440,633 A * | 8/1995 | Augustine | ............ | H04L 41/046 380/44 |
| 6,002,771 A * | 12/1999 | Nielsen | ................. | G06Q 20/04 380/30 |
| 6,160,891 A * | 12/2000 | Al-Salqan | ............ | H04L 9/0643 380/277 |
| 6,219,654 B1 * | 4/2001 | Ruffin | .................... | G06Q 10/06 705/400 |
| 6,557,008 B1 * | 4/2003 | Temple, III | .......... | G06Q 10/109 |
| 6,609,122 B1 | 8/2003 | Ensor | | |

(Continued)

FOREIGN PATENT DOCUMENTS

| | | | | |
|---|---|---|---|---|
| WO | 2005125084 A1 | 12/2005 | | |
| WO | WO-2013157957 A1 * | 10/2013 | ......... | G06F 21/6218 |
| WO | WO-2015148884 A1 * | 10/2015 | ........... | H04L 63/045 |

OTHER PUBLICATIONS

Meng, Qingjie, and Changqing Gong. "Research of cloud computing security in digital library." In Information Management, Innovation Management and Industrial Engineering (ICII), 2013 6th International Conference on, vol. 2, pp. 41-44. IEEE, 2013. (Year: 2013).*

(Continued)

*Primary Examiner* — Luu T Pham
*Assistant Examiner* — Walter J Malinowski
(74) *Attorney, Agent, or Firm* — Fletcher Yoder PC

(57) ABSTRACT

Securely communicating requests may include transmitting an encrypted response including an encryption library and a public key to a client device, the encrypted response encrypted using transport encryption established between a router device and the client device, receiving an encrypted request including data encrypted using the encryption library and the public key, the encrypted request encrypted using transport encryption established between the client device and router device, and transmitting an encrypted agent message to agent software in a customer environment, the encrypted agent message including the data encrypted using the encryption library and the public key, the encrypted agent message encrypted using transport encryption established between the router device and agent software, wherein the encrypted agent message is decryptable by the agent software using a private key inaccessible within the provider environment.

20 Claims, 8 Drawing Sheets

(56) References Cited

U.S. PATENT DOCUMENTS

| | | | |
|---|---|---|---|
| 7,020,706 B2 | 3/2006 | Cates | |
| 7,028,301 B2 | 4/2006 | Ding | |
| 7,062,683 B2 | 6/2006 | Warpenburg | |
| 7,120,609 B1* | 10/2006 | Kerkdijk | G06Q 20/02 705/78 |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,761,465 B1* | 7/2010 | Nonaka | G06F 21/10 707/770 |
| 7,769,718 B2 | 8/2010 | Murley | |
| 7,783,744 B2 | 8/2010 | Garg | |
| 7,853,782 B1* | 12/2010 | Geddes | G06F 21/33 705/78 |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 7,971,072 B1* | 6/2011 | Donlin | H04L 9/14 380/45 |
| 8,051,164 B2 | 11/2011 | Peuter | |
| 8,224,683 B2 | 7/2012 | Manos | |
| 8,266,096 B2 | 9/2012 | Navarrete | |
| 8,352,941 B1* | 1/2013 | Protopopov | G06F 9/45558 718/1 |
| 8,402,127 B2 | 3/2013 | Solin | |
| 8,452,957 B2* | 5/2013 | Pourzandi | G06F 21/6218 380/277 |
| 8,457,928 B2 | 6/2013 | Dang | |
| 8,478,569 B2 | 7/2013 | Scarpelli | |
| 8,549,135 B1* | 10/2013 | Yazdani | H04L 47/35 709/224 |
| 8,549,300 B1* | 10/2013 | Kumar | H04L 9/3247 713/153 |
| 8,606,875 B1* | 12/2013 | Chouanard | H04L 9/3268 709/217 |
| 8,612,408 B2 | 12/2013 | Trinon | |
| 8,689,241 B2 | 4/2014 | Naik | |
| 8,743,121 B2 | 6/2014 | De Peuter | |
| 8,745,394 B1* | 6/2014 | Rahat | H04L 9/0825 380/285 |
| 8,674,992 B2 | 8/2014 | Poston | |
| 8,832,652 B2 | 9/2014 | Mueller | |
| 8,850,516 B1* | 9/2014 | Hrebicek | G06F 17/30174 726/1 |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,400,875 B1* | 7/2016 | Barraclough | G06F 21/10 |
| 9,462,055 B1* | 10/2016 | Herrin | H04L 67/1095 |
| 9,535,737 B2 | 1/2017 | Joy | |
| 9,557,969 B2 | 1/2017 | Sharma | |
| 9,534,833 B2 | 5/2017 | Mueller | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,930,067 B1* | 3/2018 | Johansson | H04L 63/166 |
| 9,954,867 B1* | 4/2018 | Johansson | H04L 63/083 |
| 10,423,775 B1* | 9/2019 | Kane-Parry | G06F 21/46 |
| 2001/0011253 A1* | 8/2001 | Coley | G06F 21/10 705/59 |
| 2002/0131598 A1* | 9/2002 | Chiu | H04L 63/0442 380/270 |
| 2002/0181701 A1* | 12/2002 | Lee | H04L 9/3066 380/1 |
| 2002/0199118 A1* | 12/2002 | Yardley | G06F 21/10 726/4 |
| 2003/0014301 A1* | 1/2003 | Yaffe | G06Q 10/0639 705/7.38 |
| 2003/0135611 A1* | 7/2003 | Kemp | H04L 41/0893 709/224 |
| 2003/0200431 A1* | 10/2003 | Stirbu | H04L 9/3271 713/168 |
| 2003/0236978 A1* | 12/2003 | Evans | G06F 21/10 713/164 |
| 2004/0064351 A1* | 4/2004 | Mikurak | G06Q 10/087 705/22 |
| 2004/0148514 A1* | 7/2004 | Fee | G06F 21/51 726/22 |
| 2004/0266533 A1* | 12/2004 | Gentles | G06F 21/32 463/42 |
| 2005/0251454 A1* | 11/2005 | Wood | G06Q 20/123 705/26.81 |
| 2006/0110011 A1* | 5/2006 | Cohen | G07C 9/37 382/115 |
| 2006/0156015 A1* | 7/2006 | Kevenaar | H04L 12/18 713/181 |
| 2006/0174323 A1* | 8/2006 | Brown | H04L 63/0428 726/3 |
| 2006/0230461 A1* | 10/2006 | Hauser | H04L 63/0407 726/27 |
| 2006/0235973 A1* | 10/2006 | McBride | H04L 67/20 709/226 |
| 2007/0186009 A1* | 8/2007 | Guichard | H04L 12/4641 709/238 |
| 2007/0248062 A1* | 10/2007 | Leung | H04W 8/12 370/338 |
| 2007/0255852 A1* | 11/2007 | McBride | H04W 12/06 709/246 |
| 2007/0266258 A1* | 11/2007 | Brown | H04L 9/0822 713/183 |
| 2008/0077790 A1* | 3/2008 | Sato | H04L 63/0823 713/156 |
| 2008/0144827 A1* | 6/2008 | Davis | H04K 1/00 380/270 |
| 2009/0006844 A1* | 1/2009 | Wing | H04L 63/126 713/156 |
| 2009/0055642 A1* | 2/2009 | Myers | H04L 63/0869 713/155 |
| 2009/0089868 A1* | 4/2009 | Sasaki | H04L 29/12509 726/7 |
| 2009/0132813 A1* | 5/2009 | Schibuk | G06Q 20/223 713/158 |
| 2010/0205662 A1* | 8/2010 | Ibrahim | G06Q 30/00 726/7 |
| 2011/0093367 A1* | 4/2011 | Stapleton | G06Q 10/06 705/30 |
| 2011/0154036 A1* | 6/2011 | Wong | H04L 63/045 713/168 |
| 2011/0191198 A1* | 8/2011 | Rise | G06Q 30/0601 705/26.1 |
| 2011/0270953 A1* | 11/2011 | Levine | H04L 63/0272 709/218 |
| 2011/0296186 A1* | 12/2011 | Wong | H04L 63/0272 713/171 |
| 2012/0030672 A1* | 2/2012 | Zygmuntowicz | G06F 8/60 718/1 |
| 2012/0047366 A1* | 2/2012 | Yoo | G06F 21/566 713/171 |
| 2012/0265976 A1* | 10/2012 | Spiers | H04L 63/0218 713/2 |
| 2012/0297188 A1* | 11/2012 | van der Linden | G06F 21/602 713/165 |
| 2012/0328101 A1* | 12/2012 | Lakshminarayanan | H04L 63/0823 380/258 |
| 2013/0010955 A1* | 1/2013 | Lu | H04L 63/0485 380/255 |

(56) References Cited

U.S. PATENT DOCUMENTS

| | | | | |
|---|---|---|---|---|
| 2013/0013921 | A1* | 1/2013 | Bhathena | H04L 63/0471 713/168 |
| 2013/0091351 | A1* | 4/2013 | Manges | H04L 9/14 713/153 |
| 2013/0151400 | A1* | 6/2013 | Makhotin | G06Q 20/3226 705/39 |
| 2013/0159699 | A1* | 6/2013 | Torkkel | H04L 9/0897 713/155 |
| 2013/0232480 | A1* | 9/2013 | Winterfeldt | G06F 8/60 717/177 |
| 2013/0238900 | A1* | 9/2013 | Leggette | H04L 63/0428 713/165 |
| 2013/0252585 | A1* | 9/2013 | Moshir | G06F 21/35 455/411 |
| 2013/0297752 | A1* | 11/2013 | Bhanujan | H04L 41/0803 709/220 |
| 2013/0298239 | A1* | 11/2013 | Shroff | G06F 11/302 726/23 |
| 2013/0312067 | A1* | 11/2013 | Ogura | H04L 65/1069 726/4 |
| 2013/0315391 | A1* | 11/2013 | Yao | H04L 63/0428 380/255 |
| 2013/0316220 | A1* | 11/2013 | Lim | H01M 2/1653 429/144 |
| 2013/0318347 | A1* | 11/2013 | Moffat | H04L 9/0894 713/168 |
| 2014/0143390 | A1* | 5/2014 | Umapathy | H04L 41/0813 709/221 |
| 2014/0164776 | A1* | 6/2014 | Hook | H04L 9/14 713/171 |
| 2014/0181894 | A1* | 6/2014 | Von Bokern | H04L 63/061 726/1 |
| 2014/0189357 | A1* | 7/2014 | Park | H04L 63/061 713/171 |
| 2014/0278623 | A1* | 9/2014 | Martinez | G06Q 10/06 705/7.12 |
| 2014/0279624 | A1* | 9/2014 | Liu | G06Q 50/01 705/319 |
| 2014/0282453 | A1* | 9/2014 | O'Rourke | G06F 8/41 717/154 |
| 2014/0331297 | A1* | 11/2014 | Innes | H04L 63/08 726/7 |
| 2014/0334495 | A1* | 11/2014 | Stubberfield | H04L 49/354 370/401 |
| 2014/0373092 | A1* | 12/2014 | Hussain | H04L 63/0272 726/3 |
| 2014/0380490 | A1* | 12/2014 | Sista | G06F 21/105 726/26 |
| 2015/0052349 | A1* | 2/2015 | Gero | H04L 9/0891 713/153 |
| 2015/0052358 | A1* | 2/2015 | Udupi | H04L 63/0435 713/171 |
| 2015/0072654 | A1* | 3/2015 | Moshir | H04W 12/08 455/411 |
| 2015/0095651 | A1* | 4/2015 | Kato | H04L 63/062 713/176 |
| 2015/0095995 | A1* | 4/2015 | Bhalerao | H04L 63/0823 726/6 |
| 2015/0096011 | A1* | 4/2015 | Watt | H04L 63/0272 726/15 |
| 2015/0097961 | A1* | 4/2015 | Ure | G08B 5/223 348/159 |
| 2015/0147067 | A1* | 5/2015 | Ryan | H04B 10/116 398/118 |
| 2015/0188887 | A1* | 7/2015 | Thomas | H04L 12/4641 713/153 |
| 2015/0244711 | A1* | 8/2015 | Venkataraman | H04L 63/0823 713/156 |
| 2015/0271205 | A1* | 9/2015 | Duminuco | H04L 63/166 713/151 |
| 2015/0294405 | A1* | 10/2015 | Hanson | G06Q 40/02 705/44 |
| 2015/0309811 | A1* | 10/2015 | Wisgo | H04W 4/00 719/331 |
| 2015/0347542 | A1* | 12/2015 | Sullivan | G06F 17/30563 707/602 |
| 2015/0363246 | A1* | 12/2015 | Chen | G06Q 40/12 705/30 |
| 2015/0363469 | A1* | 12/2015 | Peloski | G06F 17/30516 707/741 |
| 2015/0365384 | A1* | 12/2015 | Rider Jimenez | H04L 63/0435 705/77 |
| 2015/0378689 | A1* | 12/2015 | Low | G06F 8/61 717/110 |
| 2016/0028834 | A1* | 1/2016 | Agrawal | H04L 43/087 709/224 |
| 2016/0044035 | A1* | 2/2016 | Huang | H04L 63/0272 726/4 |
| 2016/0057114 | A1* | 2/2016 | Unagami | H04L 63/0428 713/171 |
| 2016/0125045 | A1* | 5/2016 | Unagami | H04L 12/2809 707/722 |
| 2016/0125412 | A1* | 5/2016 | Cannon | G06Q 20/4014 705/44 |
| 2016/0142868 | A1* | 5/2016 | Kulkarni | H01Q 1/24 455/456.5 |
| 2016/0164923 | A1* | 6/2016 | Dawes | H04L 65/4084 709/227 |
| 2016/0212099 | A1* | 7/2016 | Zou | H04L 63/0263 |
| 2016/0219024 | A1* | 7/2016 | Verzun | H04L 63/102 |
| 2016/0241537 | A1* | 8/2016 | Cha | H04W 12/04 |
| 2016/0285872 | A1* | 9/2016 | Polar | H04L 67/06 |
| 2016/0314066 | A1* | 10/2016 | Mirza | G06F 11/3692 |
| 2016/0316360 | A1* | 10/2016 | Rainisto | H04L 63/0861 |
| 2016/0323736 | A1* | 11/2016 | Donahue | H04W 12/04 |
| 2016/0330177 | A1* | 11/2016 | Singleton, IV | H04L 63/0435 |
| 2016/0352720 | A1* | 12/2016 | Hu | H04L 67/10 |
| 2016/0371701 | A1* | 12/2016 | Mirza | G06Q 30/016 |
| 2016/0373258 | A1* | 12/2016 | Bone | G06F 9/4401 |
| 2016/0379269 | A1* | 12/2016 | Ellis | G06Q 30/0269 705/14.45 |
| 2016/0380762 | A1* | 12/2016 | Hirao | H04L 9/0618 713/171 |
| 2017/0003828 | A1* | 1/2017 | Gorman | G06F 3/0481 |
| 2017/0026414 | A1* | 1/2017 | Frydman | H04L 12/66 |
| 2017/0034023 | A1* | 2/2017 | Nickolov | H04L 43/0817 |
| 2017/0053273 | A1* | 2/2017 | Jeong | G06Q 20/3226 |
| 2017/0126472 | A1* | 5/2017 | Margalit | H04L 41/0604 |
| 2017/0163624 | A1* | 6/2017 | Mattsson | H04W 76/18 |
| 2017/0169226 | A1* | 6/2017 | Rajcan | H04L 63/08 |
| 2017/0171172 | A1* | 6/2017 | Sullivan | H04L 63/061 |
| 2017/0195105 | A1* | 7/2017 | Toba | H04N 21/436 |
| 2017/0195745 | A1* | 7/2017 | Kumar Bvn | H04N 21/2387 |
| 2017/0230521 | A1* | 8/2017 | Hayashi | H04N 1/00344 |
| 2017/0249132 | A1* | 8/2017 | Andrews | G06F 8/60 |
| 2017/0329701 | A1* | 11/2017 | Patnaik | G06F 11/3692 |
| 2017/0331893 | A1* | 11/2017 | Crofton | H04L 67/1097 |
| 2017/0337390 | A1* | 11/2017 | Hamilton | G06F 21/6218 |
| 2017/0359317 | A1* | 12/2017 | Anderson | H04L 63/0471 |
| 2017/0371741 | A1* | 12/2017 | Gopal | G06F 11/1004 |
| 2018/0295105 | A1* | 10/2018 | Feng | H04W 4/80 |
| 2018/0332434 | A1* | 11/2018 | Kulkarni | H04L 67/22 |

OTHER PUBLICATIONS

Harbitter, Alan, and Daniel A. Menasce. "A methodology for analyzing the performance of authentication protocols." ACM Transactions on Information and System Security (TISSEC) 5, No. 4 (2002): 458-491. (Year: 2002).*

Pitropakis. "Its All in the Cloud: Reviewing Cloud Security." In 2013 IEEE 10th International Conference on Ubiquitous Intelligence and Computing and 2013 IEEE 10th International Conference on Autonomic and Trusted Computing, pp. 355-362. IEEE, 2013. (Year: 2013).*

Owens, Dustin. "Securing elasticity in the cloud." Communications of the ACM 53, No. 6 (2010): 46-51. (Year: 2010).*

(56) References Cited

OTHER PUBLICATIONS

Patil, Jaie; "Secure Media Streaming for Android", A Project Presented to The Faculty of the Department of Computer Science, San Jose State University, Dec. 2012, 57 pp.

Mannan, Mohammad, et al.; "Mercury: Recovering Forgotten Passwords Using Personal Devices", Post-Proceedings of Financial Cryptography and Data Security 2011, Nov. 18, 2011, 16 pp.

\* cited by examiner

SYSTEM AND METHOD FOR SECURELY COMMUNICATING REQUESTS

TECHNICAL FIELD

The present disclosure relates in general to systems and methods for securely communicating requests within a computing infrastructure.

BACKGROUND

Devices within a computing infrastructure may exchange communications, such as requests for retrieving data, responses including requested data, or the like, via private communication channels, shared, or public, communication channels, or combinations thereof. Communication channels may be subject to eavesdropping, and communications transmitted therein may be accessed without authorization. Therefore, systems and methods for securely communicating requests, such as password reset requests, via computing communications systems may be advantageous.

SUMMARY

Disclosed herein are implementations of systems and methods for securely communicating requests.

In some implementations, a system is provided for securely communicating a request between a client device and a device of a customer environment via a computer communication network. The system comprises a provider environment including a router device and a server device. The server device includes a processor, a memory, and a network interface. The memory includes instructions executable by the processor to transmit, in response to receiving a first request from the client device, an encrypted response including an encryption library and a public key to the client device, the encrypted response encrypted using transport encryption established between the router device and the client device. The memory further includes instructions executable by the processor to receive, from the client device, an encrypted request including data encrypted using the encryption library and the public key, the encrypted request encrypted using transport encryption established between the client device and the router device. The memory further includes instructions executable by the processor to transmit an encrypted agent message to agent software executed on a customer device in the customer environment, the encrypted agent message including the data encrypted using the encryption library and the public key, the encrypted agent message encrypted using transport encryption established between the router device and the agent software. The encrypted agent message is decryptable, to extract the data encrypted using the encryption library and the public key, by the agent software using a private key, wherein the private key is inaccessible within the provider environment.

In some implementations, a method is provided for securely communicating a request between a client device and a device of a customer environment via a computer communication network, the computer communication network including a provider environment, the provider environment including a router device and a server device. The method comprises transmitting, in response to receiving a first request from the client device, an encrypted response including an encryption library and a public key to the client device, the encrypted response encrypted using transport encryption established between the router device and the client device. The method further comprises receiving, from the client device, an encrypted request including data encrypted using the encryption library and the public key, the encrypted request encrypted using transport encryption established between the client device and the router device. The method further comprises transmitting an encrypted agent message to agent software executed on a customer device in the customer environment, the encrypted agent message including the data encrypted using the encryption library and the public key, the encrypted agent message encrypted using transport encryption established between the router device and the agent software. The encrypted agent message is decryptable, to extract the data encrypted using the encryption library and the public key, by the agent software using a private key, wherein the private key is inaccessible within the provider environment.

In some implementations, a system is provided for securely communicating a request between a client device and a device of a customer environment via a computer communication network. The system comprises a server device including a processor, a memory, and a network interface. The memory includes instructions executable by the processor to control the network interface to transmit a public key to the client device. The memory further includes instructions executable by the processor to control the network interface to receive, using transport encryption, an encrypted request from the client device, the encrypted request encrypted using the public key. The memory further includes instructions executable by the processor to control the network interface to transmit, using transport encryption, the encrypted request to agent software executed on a customer device in the customer environment. The encrypted request is decryptable by the agent software using a private key corresponding to the public key.

These and other implementations of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
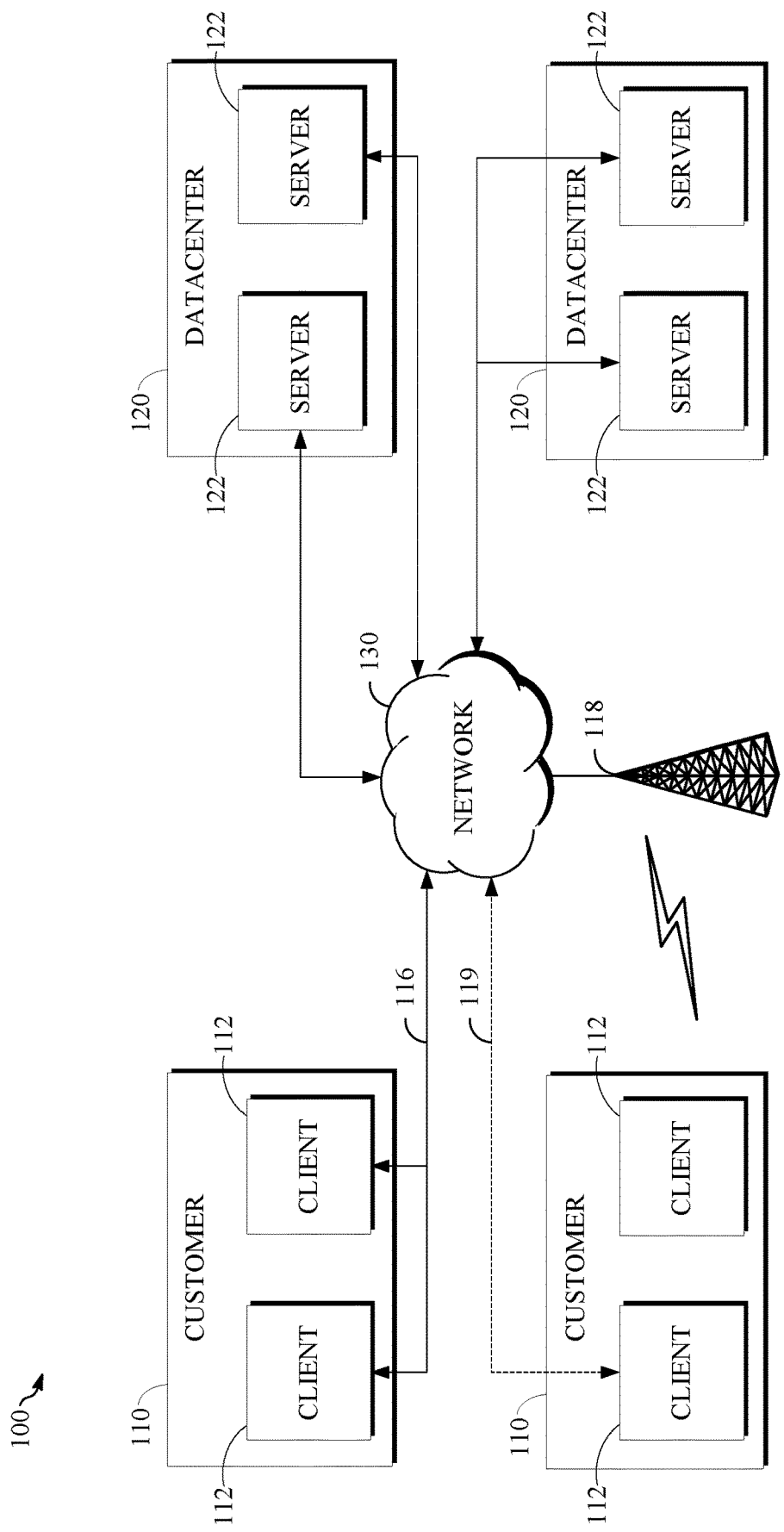
FIG. 1 is a block diagram of a distributed or cloud computing system.

Devices operating within a computing infrastructure may exchange communications, such as communications related to a request to create or modify a password, which may include sensitive or otherwise private information. Security measures can be implemented within the computing infrastructure to protect the communicated data. One type of security measure is cryptography, which can mitigate or eliminate the risk of unauthorized access to sensitive data by transforming the data from an unsecure form, such as plaintext form, into an encrypted form. For example, communications transmitted to create or modify a password may include the text of a newly generated password, and, to mitigate or reduce the risk of unauthorized access to the password, the password may be transformed from plaintext into an encrypted form by an encryption algorithm prior to transmission such that the encrypted data may be indecipherable without an encryption key associated with the encryption. In some implementations, encrypted password data communicated using unsecured channels may be compromised if, for example, the encryption key is compromised.

In some implementations, sensitive data communicated via a private datacenter may be communicated between provider devices within the private datacenter without sufficient protection from unauthorized access. For example, a customer may operate a computer network and a client device may communicate with a customer device within the customer environment, which may include communicating through devices of an intermediate service provider environment, such as devices of a datacenter. Data communicated via the service provider environment may be encrypted between the client device and a service provider device within the service provider environment, and may be encrypted between a service provider device within the service provider environment and the customer device. In some implementations, the data may be communicated between service provider devices within the service provider environment without encryption, or the devices or software of the provider environment may be otherwise compromised, and the communications within the provider environment can be comprised by an unauthorized eavesdropper.

For example, a computing infrastructure may implement symmetric key cryptography using transport encryption, such as a Secure Sockets Layer (SSL) or Transport Layer Security (TLS) protocol, between a client device and a provider device in a provider environment, such as a datacenter. A request, such as a password reset request, may be initiated at the client device, and a new password may be encrypted using a symmetric key negotiated between the client device and a load balancer within the provider environment. The encrypted password may be transmitted to and decrypted by the load balancer using a secure protocol, such as SSL or TLS. The decrypted password may be transmitted by the load balancer in plaintext form to a platform instance implemented in the provider environment, such as on a server device at the datacenter, and the password transmitted in plaintext form between the load balancer and platform instance may be compromised by an unauthorized eavesdropper.

In some implementations, data communicated between a client device and a provider device in a provider environment, or between a provider device in the provider environment and a customer device in a customer environment, may be compromised by an eavesdropper with unauthorized access to an encryption key. For example, a device within the provider environment, such as a server device operating a platform instance, may encrypt the password using a symmetric key shared with a proxy server in the customer environment. An unauthorized eavesdropper may obtain the symmetric key and intercept and decrypt the password. The use of multiple key sets throughout the password reset process can introduce further opportunities for communications to be unsecured or maliciously intercepted.

Implementations of the present disclosure include systems and methods for securely communicating requests within a computing infrastructure. A public key and private key pair, generated by agent software in a customer environment, can be used by a client device to encrypt communications from the client device to the customer environment via an intermediate provider environment. In some implementations, the public key can be used to encrypt a new password generated at a client device, and a private key, securely retained within the agent software, can be used to decrypt the encrypted password. For example, the agent software can transmit the public key to a platform instance implemented in the provider environment, the platform instance can receive a request from the client device initiating a password reset, and can transmit the public key to the client device for encrypting the new password. The public key-encrypted password can be transmitted to the provider environment, such as via a router of the provider environment, which can send the encrypted password to the platform instance. The router can use a transport encryption, such as SSL or TLS, as a second layer of encryption for communicating with devices and software external to the provider environment. The public key-encrypted password can be transmitted, such as by using the router device, to the agent software for decryption using the private key. Because the private key is not transmitted outside of the customer environment, at least one layer of encryption is used to secure the end-to-end communications within the computing infrastructure (e.g., between the client device and the provider environment, between the provider environment and the customer environment, and between the hardware devices and software included within the provider environment).

The systems and methods of the present disclosure address problems particular to computing networks, for example, those concerning the security of requests communicated between client devices and customer environments in a cloud computing infrastructure. These computing infrastructure-specific issues can be solved by implementations of the present disclosure. For example, the ability of a cloud computing infrastructure to restrict access to resources of a computer network through a cloud computing instance can depend upon the degree to which passwords are securely stored and communicated throughout the infrastructure. The development of new ways to securely communicate requests is fundamentally related to computing infrastructures. Implementations of the present disclosure can provide a way to encrypt request data and securely communicate the encrypted data throughout a cloud computing infrastructure using multiple layers of encryption, wherein one layer of encryption cannot be decrypted outside of a customer environment. Thus, the security measures involved in communicating requests within a cloud computing infrastructure are improved by the systems and methods of the present disclosure.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer, a virtual machine and the like. The datacenter 120 and servers 122 are examples only, and a cloud computing system may have a different number of datacenters and servers or may have a different configuration of datacenters and servers. For example, there may be tens of datacenters and each datacenter may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in cloud computing system 100. In some implementations, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
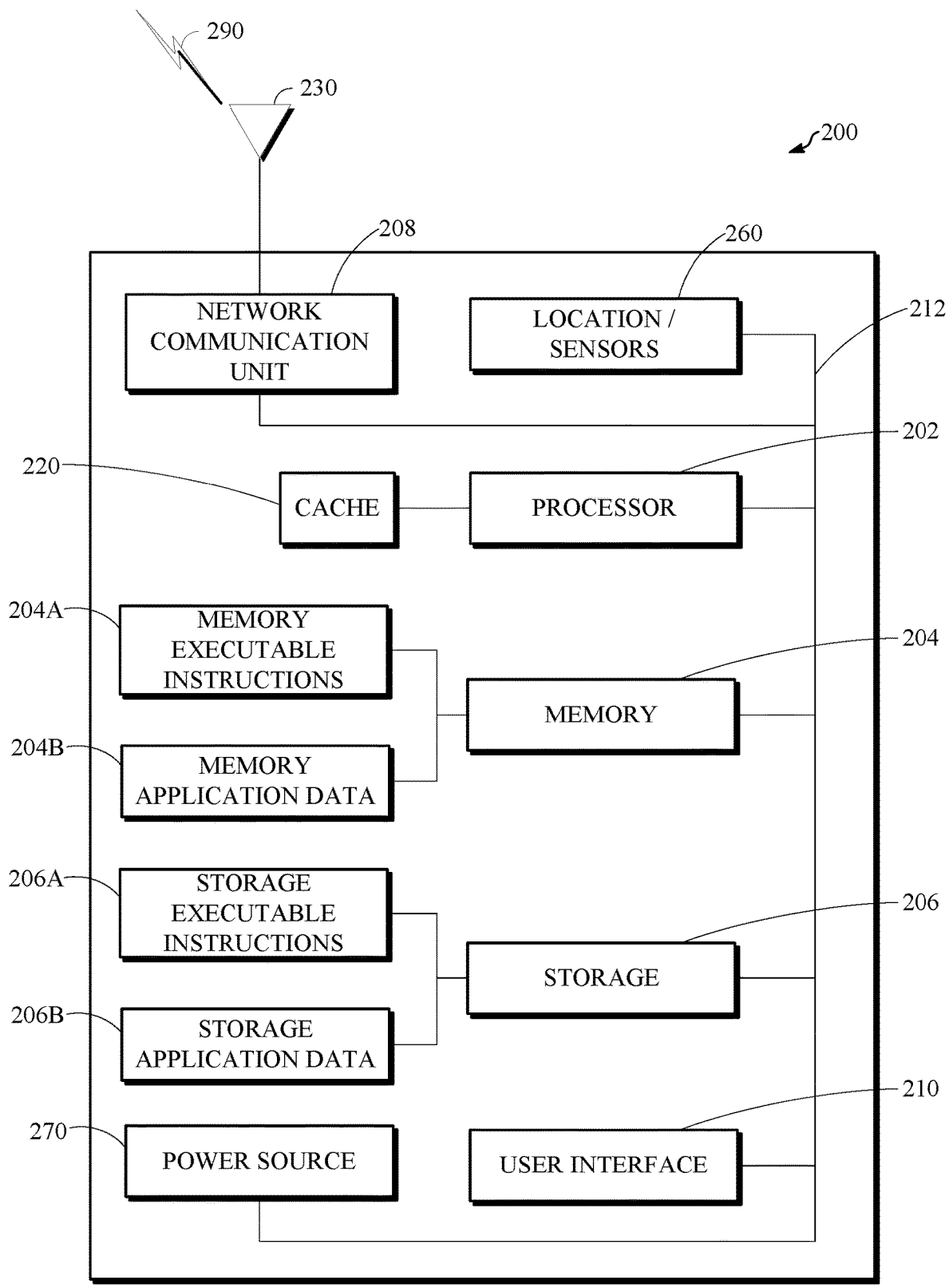
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client 112 or server 122 of the computing system 100 as shown in FIG. 1, including an infrastructure control server of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. processor 202 can be a central processing unit, such as a microprocessor, and can include single or multiple processors, each having single or multiple processing cores. Alternatively, processor 202 can include another type of device, or multiple devices, capable of manipulating or processing information now-existing or hereafter developed. When multiple processing devices are present, they may be interconnected in any manner, including hardwired or networked, including wirelessly networked. Thus, the operations of processor 202 can be distributed across multiple machines that can be coupled directly or across a local area or other network The processor 202 can be a general purpose processor or a special purpose processor.

Random Access Memory (RAM) 204 can be any suitable non-permanent storage device that is used as memory. RAM 204 can include executable instructions and data for access by processor 202. RAM 204 typically comprises one or more DRAM modules such as DDR SDRAM. Alternatively, RAM 204 can include another type of device, or multiple devices, capable of storing data for processing by processor 202 now-existing or hereafter developed. Processor 202 can access and manipulate data in RAM 204 via bus 212. The processor 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by processor 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to processor 202 via bus 212. The network communication unit 208 can utilize any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the computing device 200 itself or the environment around the computing device 200, or it may contain a location identification unit 260, such as a GPS or other type of location device. The computing device 200 may also contain a power source 270, such as a battery, so that the unit can operate in a self-contained manner. These may communicate with the processor 202 via the bus 212.

Figure 3:
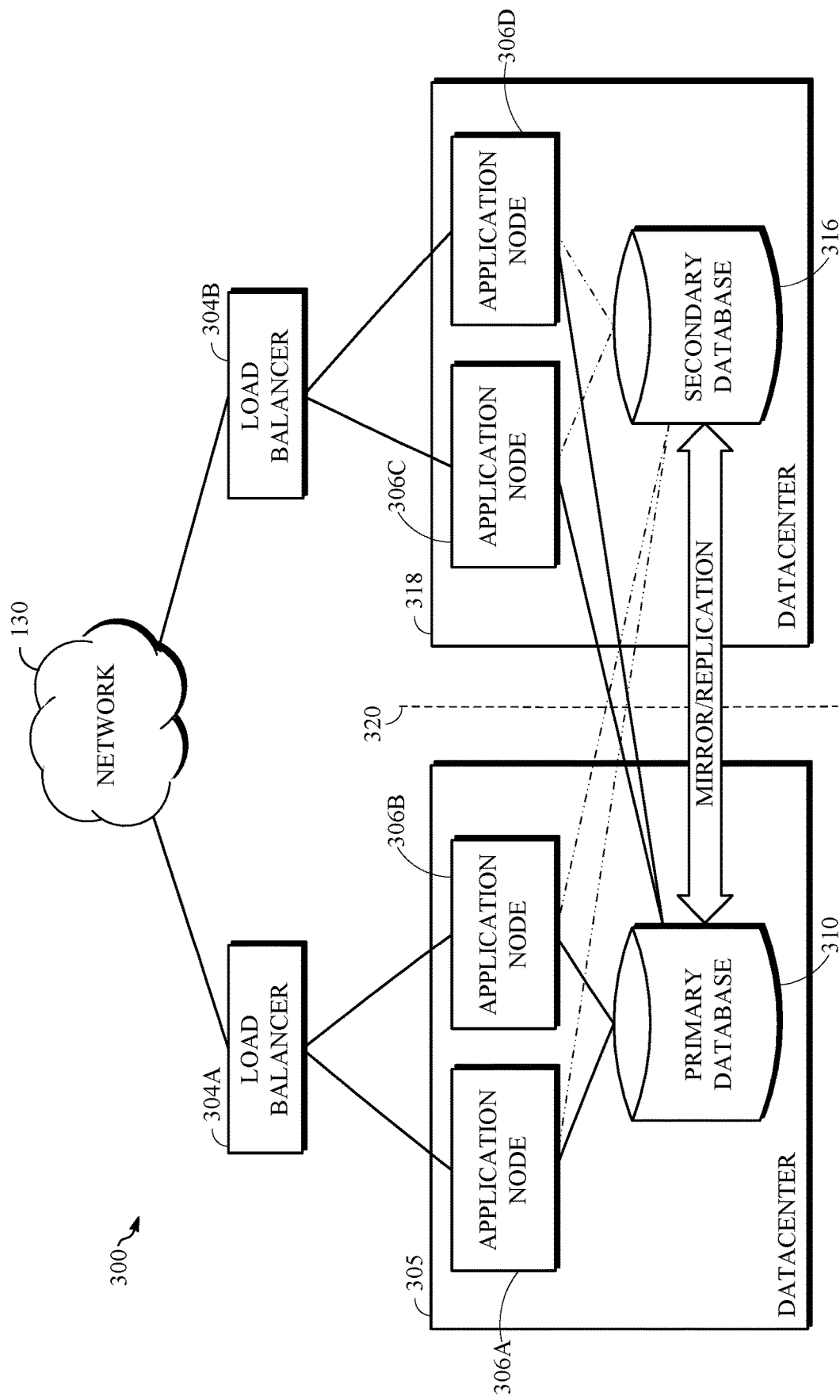
FIG. 3 is a block diagram of an implementation of a high availability processing system.

FIG. 3 is a block diagram of an implementation of a high availability processing system. The illustrated distributed computing system 300 can be, for example, an implementation of datacenter 120 and network 130 of FIG. 1. Broadly, the system 300 includes load balancers 304A, 304B and two datacenters 305, 318. The load balancers 304A, 304B are coupled to a telecommunications network graphically depicted by network 130. Load balancers 304A, 304B may also include reverse proxy load balancers.

The datacenter 305 includes a primary database 310, and the datacenter 318 includes a secondary database 316. The datacenters 305, 318 operate in such a manner that the secondary database 316 can provide an exact or substantially exact mirror of the primary database 310. A line 320 is used to graphically emphasize the logical boundary between datacenters 305 and 318. Depending upon the intended application, the databases 310, 316 may be implemented using, for example, a relational database management system (RDBMS), an object database, an XML database, flat files, or the like. In some implementations, datacenters 305, 318 include web servers (e.g., Apache installations) implemented on physical hardware servers (e.g., servers 122 of datacenter 120 of FIG. 1) for processing client requests to access resources of a customer computer network.

Each datacenter can include two application nodes 306A, 306B, 306C, 306D, although a greater or lesser number can be used depending on the implementation. The application nodes can be implemented using processing threads, virtual machine instantiations, or other computing features of the datacenters that run programs on behalf of remotely sited clients, and exchange related data with such clients via the network 130. In connection with running these programs, occasions arise for the application nodes to store and retrieve data, with the databases 310 and 316 filling this role. In some implementations, each of the application nodes connects to a single primary database, regardless of whether said database is located in the same datacenter as said application node. For example, a primary database may be read/write and a secondary database may be configured to be read-only such that it mirrors changes from the primary database. Requests to the system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines.

As mentioned above, each datacenter 305, 318 may have its own load balancer 304A, 304B. Each load balancer may be configured to direct traffic to respective servers and processing nodes located within its datacenter. In regard to proxy services, in one example the load balancers 304A, 304B are configured to provide a single Internet-delivered service to remote clients via the network 130, where this service is actually provided by a server farm composed of the computerized servers of the datacenters 305, 318. The components 304A, 304B also coordinate requests from remote clients to the datacenters 305, 318, simplifying client access by masking the internal configuration of the datacenters. The components 304A, 304B may serve these functions by directing clients to processing nodes as configured directly or via DNS. Load balancer 304A, 304B can be configured for sticky sessions. With sticky sessions, requests from a client can be forwarded to the same application node 306 for the duration of the client session.

In regard to load balancing, the components 304A, 304B can be configured to direct traffic to the secondary datacenter in the event the primary datacenter 305 experiences one of many enumerated conditions predefined as failure. The load balancing functionality of the load balancers 304A, 304B can be provided as separate components or as a single component.

The distributed computing system 300 can allocate resources of a computer network using a multi-tenant or single-tenant architecture. Under a multi-tenant architecture, installations or instantiations of application, database, and/or other software application servers may be shared amongst multiple customers. For example, a web server (e.g., a unitary Apache installation), application server (e.g., unitary Java Virtual Machine) and/or a single database server catalog (e.g., a unitary MySQL catalog) may handle requests from multiple customers. In some implementations of this architecture, the application and/or database server software can distinguish between and segregate data and other information of the various customers using the system.

In a single-tenant infrastructure, separate web servers, application servers, and/or database servers can be provisioned for each customer instance. In some implementations, each customer will access its dedicated web server(s), will have its transactions processed using its dedicated application server(s), and will have its data stored in its dedicated database server(s) and or catalog(s). Physical hardware servers may be shared such that multiple installations or instantiations of web, application, and/or database servers may be installed on the same physical server. Each installation may be allocated a certain portion of the physical server resources, such as RAM, storage, and CPU cycles.

In some implementations, a customer instance comprises multiple web server instances, multiple application server instances, and multiple database server instances. The server instances may be located on different physical servers and share resources of the different physical servers with a number of other server instances associated with other customer instances. In a given cloud computing system, different implementations of customer instances may be used for different customer instances at the same time. Other configurations and implementations of customer instances may also be used. For example, in some implementations, web server and application server functionality are treated as a single unit (of which there may be multiple units present), each unit being installed on respective physical servers.

Certain operational aspects of the disclosure will now be described with reference to FIGS. 4 through 6. Generally, FIGS. 4 through 6 describe implementations for securely communicating requests. For example, the implementations can be used for the secure communication of a password reset request received from a client device for processing by agent software in a customer environment. The communication and processing of the password reset request may be performed using server devices executing a cloud computing instance implemented, for example, via application nodes and databases (e.g., application nodes 306A, 306B, 306C, 306D and database nodes 310, 316 of FIG. 3).

For example, a provider environment can refer to hardware devices and software associated with a datacenter 305, 318. A router can be implemented as a load balancer 304A, 304B for directing data communications between devices outside of the provider environment (e.g., a client device) and one or more server devices at datacenter 305, 318. A platform instance and a database can be implemented as a group using one or more application nodes 306A, 306B, 306C, 306D and one or more database nodes 310, 316, respectively, wherein each group can execute on a different server device of datacenter 305, 318. However, the implementations of FIGS. 4 through 6 are not limited to the implementations of FIG. 3. For example, a client device can refer to any computing device 200 or other device configured to interface with a provider environment. As another example, a server device can refer to any computing device 200 or other device configured for use with a provider environment. As another example, a customer device can refer to any computing device 200 or other device configured for use with a customer environment.

In some implementations, a provider environment can include networks and/or devices controlled (wholly or partially) by a provider, for example, a service provider of a Platform as a Service (PaaS) service. Thus, the provider environment can refer to networks and devices implemented within a datacenter under the control of a provider. In some implementations, the provider environment can also or instead refer to networks and devices outside of a datacenter, within multiple datacenters, or any other networks, devices, and/or software under the control of a provider. In some implementations, a customer environment can include networks and/or devices controlled (wholly or partially) by a customer, for example, a customer of a PaaS service provider. For example, the customer environment can include networks, devices, and/or software under the control of a customer operating an Infrastructure as a Service (IaaS) service, for example, cloud computing instances implemented using resources of a provider, but controlled by the customer. Depending on the implementation, there can be varying levels of control for networks and/or devices by a provider environment or customer environment. For example, there can be some overlap in control of certain devices between a provider environment and a customer environment, such as a particular server device used to implement a first instance controlled by the provider and a second instance controlled by the customer. In some implementations, a provider environment can have limited access to a customer environment. In some implementations, a customer environment can have limited access to a provider environment.

Implementations for securely communicating requests can be included, in whole or in part, as part of one or more graphical display regions for outputting data to display for a user. In some implementations, a graphical display region can comprise part of a software graphical user interface constituting data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Figure 4:
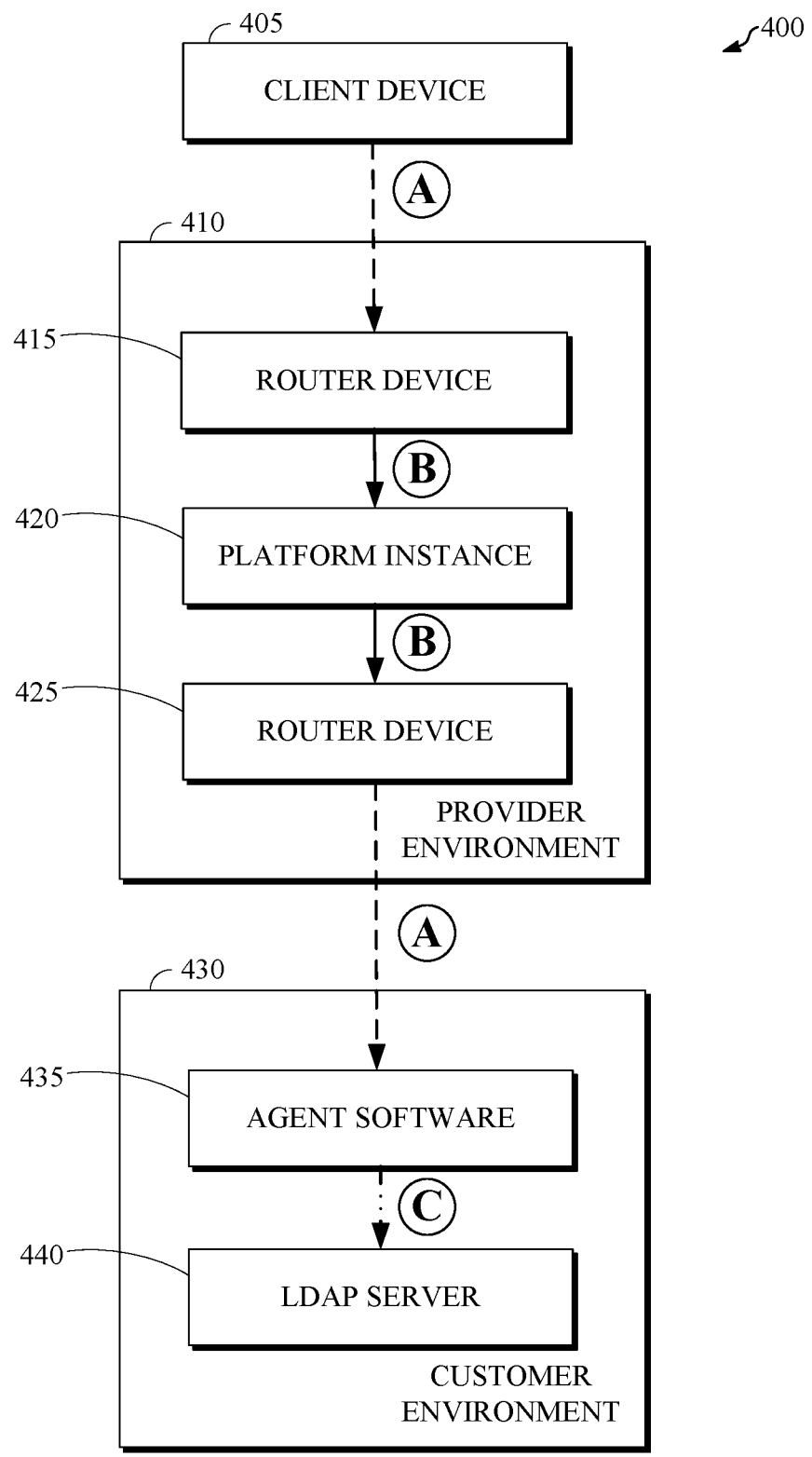
FIG. 4 is a block diagram of an implementation of a system using multiple layers of encryption for securely communicating a request within a computing infrastructure.

FIG. 4 is a block diagram of an implementation of a system 400 using multiple layers of encryption for securely communicating a request within a computing infrastructure. In some implementations, a computing infrastructure can include a client device, such as client device 405, a provider environment, such as provider environment 410, and a customer environment 430. In some implementations, the computing infrastructure can include a computer communication network for exchanging communications between the devices and software of the computing infrastructure, including client device 405, devices and software of provider environment 410, and devices and software of customer environment 430.

In some implementations, at least two layers of encryption can be used when communicating data between a client device 405 and a device in a provider environment 410 or between a device in provider environment 410 and a device in a customer environment 430, as labeled "A" in the figure. For example, a layer of encryption can include using a public key to encrypt a request, and another layer of encryption can include encrypting communications that include the public key using transport encryption, for example, SSL or TLS. In some implementations, at least one layer of encryption can be used when communicating data within provider environment 410, as labeled "B" in the figure. For example, a layer of encryption used within provider environment 410 can include the encrypted request, encrypted by the public key, within provider environment 410. In some implementations, at least one layer of encryption can be used when communicating data within customer environment 430, as labeled "C" in the figure. For example, a layer of encryption used within customer environment 430 can include encrypting and communicating a request using transport encryption, wherein the encrypted request is decryptable by agent software 435 upon being received within customer environment 430. In some implementations, LDAP over SSL can be used for the secure communication of data between agent software 435 and LDAP server 440 within customer environment 430. For example, the SSL of the LDAP over SSL can use public key cryptography (e.g., RSA) to negotiate an ephemeral symmetric key between agent software 435 and LDAP server 440. Agent software 435 can re-encrypt the request with the ephemeral symmetric key before the request is communicated to LDAP server 440. In some implementations, the SSL of the LDAP over SSL can be TLS. Notwithstanding the distinctions in the layers used throughout the process of securely communicating a request from client device 405 to a device within customer environment 430, at least one layer of encryption used at each stage protected from decryption outside of customer environment 430. For example, data communicated throughout system 400 can be encrypted using asymmetric key cryptography wherein public key encrypted data can only be decrypted using a private key stored in customer environment 430. The private key may be inaccessible within provider environment 410.

In some implementations, a request communicated between client device 405 and a device of customer environment 430 may include a password reset request, which may include a newly generated password, such as a password received in response to user input, such as input received from a user of client device 405 via a web browser executed on client device 405. Client device 405 can encrypt the new password, for example, using a public key originating from agent software 435. Once encrypted, the new, encrypted password can be transmitted to a device within provider environment 410 on which a cloud computing platform instance 420 is implemented. In some implementations, the encrypted password can be communicated from client device 405 to a device within provider environment 410 using transport encryption as an additional layer of encryption. For example, the communication of the encrypted password from client device 405 to a device within provider environment 410 can be done using SSL or TLS.

In some implementations, a router device 415 within or otherwise associated with provider environment 410 can terminate the transport encryption and relay the encrypted password received from client device 405 to a device implementing platform instance 420. Platform instance 420 can store, or cause to be stored, the encrypted password for later use within system 400, for example, within a database accessible by platform instance 420. The platform instance can be, for example, a single-tenant or multi-tenant environment implemented in provider environment 410 for deploying resources to devices of a computer network and/or delivering services within a computing infrastructure. In some implementations, after the encrypted password is stored, the encrypted password can be communicated from a device within provider environment 410 to a device within customer environment 430 using transport encryption as a layer of encryption. For example, the encrypted password can be communicated from a device within provider environment 410 to a device within customer environment 430 using SSL or TLS. In some implementations, the encrypted password can be communicated by a router device 425 within, or otherwise associated with, provider environment 410. In some implementations, router device 415 and router device 425 can be the same or different router devices.

In some implementations, router devices 415, 425 (whether implemented as the same router device or different router devices) can demarcate between elements within the provider environment 410 and external elements, such as external elements in communication with elements within provider environment 410. Thus, router devices 415, 425 can relay communications as a server for transport encryption, for example, SSL or TLS. In some implementations, router devices 415, 425 can be load balancers, or any other logical or physical device capable of routing communications through provider environment 410 to or from client device 405 or a device within customer environment 430.

The encrypted password can be communicated from a device within provider environment 410 to agent software 435 via a device within customer environment 430 on which agent software 435 is installed. In some implementations, agent software 435 can decrypt the password using a private key corresponding to the public key used to encrypt the password. For example, prior to the password reset request being communicated from client device 405, agent software 435 can generate a private and public key pair usable for implementing asymmetric key cryptography. In some implementations, and in response to agent software 435 decrypting the encrypted password, agent software 435 can re-encrypt the decrypted password using an ephemeral symmetric key negotiated with LDAP server 440. In some implementations, the ephemeral symmetric key can be a 128-bit or other size key encrypted using the Advanced Encryption Standard (AES). Agent software 435 can then securely transmit the re-encrypted password to LDAP server 440 using LDAP over SSL.

Although transport encryption is described herein as being SSL or TLS, any other protocol, or combination of protocols, can be used as the transport encryption to encrypt the data for, during, or proximate to transmission, receipt, or other communication. For example, networking protocols such as SPDY can be used to modify generally unsecured protocols, such as HTTP, in order to encrypt the data. Other application layer protocols can be used (to the extent applicable based, for example, on the data being communicated) or modified (to the extent possible) for use in securely communicating data, including, without limitation, FTP, HTTP/2, SMTP, SSH, XMPP, or the like.

Figure 5:
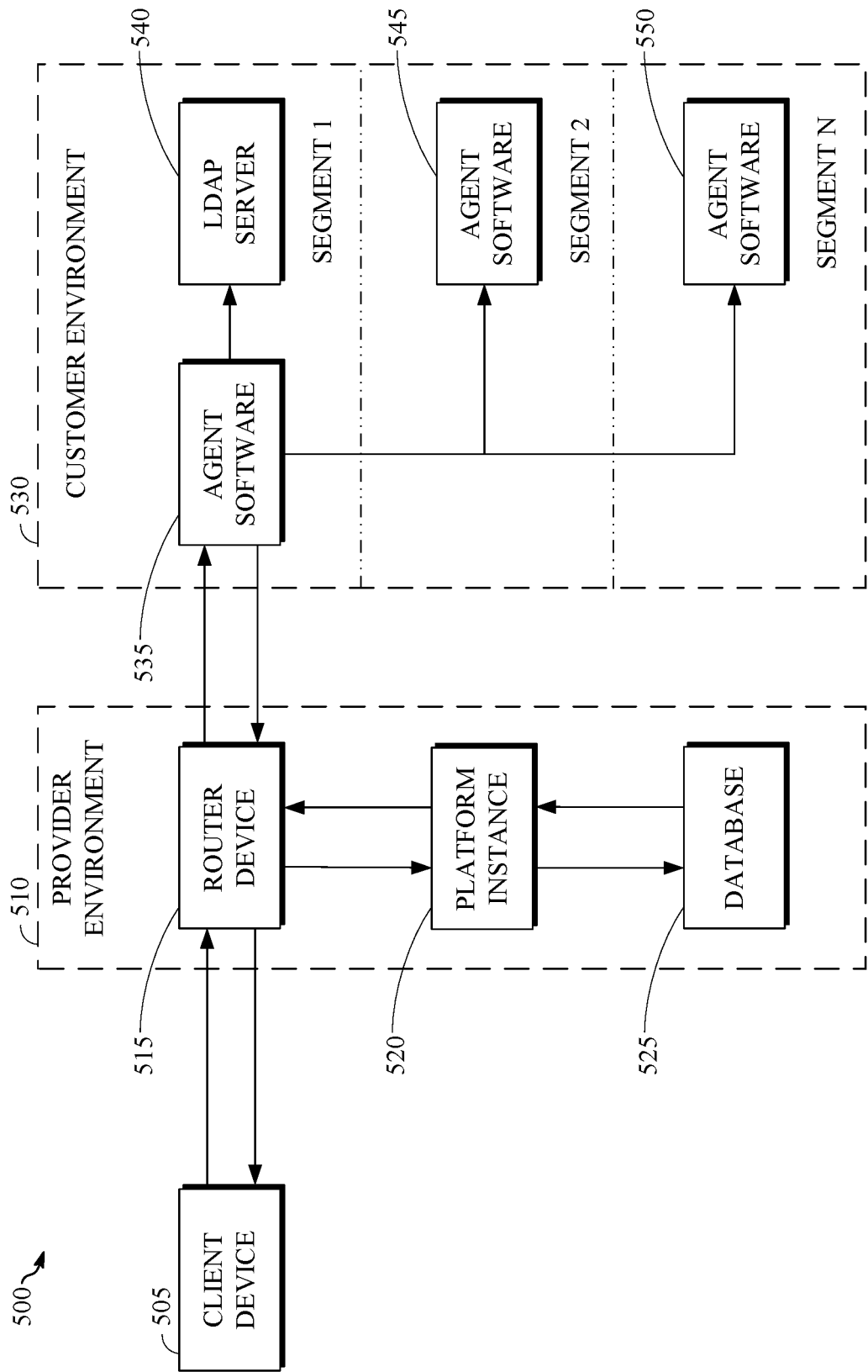
FIG. 5 is a block diagram of an implementation of a system for securely communicating a request from a client device to a device of a customer environment via an intermediate provider environment.

FIG. 5 is a block diagram of an implementation of a system 500 for securely communicating a request from a client device 505 to a device of a customer environment 530 via an intermediate provider environment 510. A unique private and public key pair, such as an RSA key of N (e.g., 2,048) bits, may be generated in response to input, such as user input, such as input received from a system administrator or other user of customer environment 530 authorized to access agent software instances 535, 545, 550 (via one or more executions of the agent software in customer environment 530), and may be encrypted using password based encryption. In some implementations, the private and public key pair can be generated by an agent software instance. In some implementations, the private and public key pair can be generated by a separate mechanism, such as a key generator executed within customer environment 530, and transmitted to the agent software instance. In some implementations, the encrypted private and public key pair can be uploaded to platform instance 520, for example, for storage in database 525. In some implementations, platform instance 520 can transmit the private and public key pair to one or more agent software instances 535, 545, 550 within customer environment 530, which may include storing the private and public keys within data stores used by the agent software instance. In some implementations, the key pair and password may be transmitted to or stored at each agent software instance within customer environment 530 using RDP or SSH in response to input, such as input received from a system administrator or other authorized user of customer environment 530.

Using a web browser executed on client device 505, and, in some implementations, an encryption library (e.g., a JavaScript library) available to the web browser, a password reset request may be initiated in response to input, such as user input received via the web browser, which may include generating a new password and encrypting the new password using the public key, wherein the encryption library, or a portion thereof, may be received from platform instance 520. In some implementations, the web browser can use a JavaScript library to encrypt the new password using the public key. The encrypted password can be communicated from client device 505 to a device within provider environment 510. In some implementations, the communication of the encrypted password from client device 505 to a device within provider environment 510 may include using transport encryption, such as SSL or TLS, along with data indicating the public key. Router device 515 can receive the encrypted password from client device 505 and relay the encrypted password to platform instance 520. In some implementations, router device 515 can be a load balancer or other device or software for routing data communicated between devices and software of provider environment 510 (e.g., a server device of provider environment 510) and client device 505 or between devices and software of provider environment 510 and devices and software of customer environment 530 (e.g., agent software instance 535, 545, 550 or devices on which agent software instance 535, 545, 550 are implemented). In some implementations, platform instance 520 can verify that the key pair is accessible by agent software instance 535, 545, 550 before the public key is communicated to client device 505 (e.g., in response to a user initiating a password reset request).

In some implementations, generating a request (e.g., a new password or other message) and encrypting it at client device 505 can include additional or substitute steps, which may be based on the size of the data in the request. For example, to support encryption for requests comprising larger sizes (e.g., requests exceeding one megabyte, such as those including a picture of a driver's license, passport, or the like), an ephemeral symmetric key (e.g., an AES key, such as AES128) can be generated on client device 505 using a cryptographically secure random number generator algorithm included in the encryption library. The cryptographically secure random number generator algorithm can be a hashing algorithm or a deterministic random bit generator (DRBG) algorithm, for example, a keyed-hash message authentication code DRBG (HMAC-DRBG) algorithm. In some implementations, an AES algorithm using the cipher blocking chain mode (e.g., AES-CBC-128) can encrypt the request using the ephemeral AES-128 symmetric key. After the request is encrypted, the ephemeral symmetric key can be encrypted using the public key transmitted from within provider environment 510. For example, the public key encrypted new symmetric key can be concatenated to the encrypted request using instructions executed though the web browser on client device 505. In some implementations, the new symmetric key can be used to encrypt requests of any size.

In some implementations, platform instance 520 can include or otherwise cause the execution of instructions that, when executed, store the encrypted password, such as within a table of a database 525 associated with platform instance 520. For example, platform instance 520 can store the encrypted password within a message queue, which may be queried, updated, or otherwise accessed, by other systems integrating with platform instance 520. An input message can be added to the message queue to indicate that platform instance 520 stored the encrypted password, and an output message can be added to indicate that platform instance 520 communicated the encrypted password for further processing. The input and output messages can be implemented via an external communication channel (ECC) queue, which can be used to organize (e.g., queue) the communications between devices on which agent software instance 535, 545, 550 and platform instance 520 are implemented. In some implementations, agent software instance 535, 545, 550 can be configured to communicate with platform instance 520 on a periodic or non-periodic, such as event triggered, basis to retrieve commands and information from the ECC queue to be processed by agent software instance 535, 545, 550. For example, agent software instance 535 can send a request to platform instance 520 every 60 seconds asking for platform instance 520 to transmit any messages stored within database 525 awaiting receipt by agent software instance 535 (e.g., an encrypted password transmitted from client device 505). As another example, agent software instance 535 can send a request to platform instance 520 via a first port (e.g., port 80) of router device 515 that, once received by platform instance 520, can cause a second port (e.g. port 443) of router device 515 to open such that platform instance 520 can cause a message awaiting receipt by agent software instance 535 to be transmitted to agent software instance 535.

In some implementations, data stored within database 525 can be subject to staleness rules for removing (e.g., deleting, archiving, or otherwise deprecating) data that has been stored within database 525 for a longer period of time than a staleness period, which can be a threshold defined by an authorized customer user or set by provider environment 510. For example, database 525 can implement staleness rules to remove data stored for more than seven days. The staleness rules can be used to preserve the integrity of the stored data and limit the time during which stored data can be used to fulfill requests processed with system 500.

In some implementations, agent software instance 535, 545, 550 can be a Java application, for example, implemented as a Windows® service or Unix daemon, implemented as a proxy within customer environment 530. In some implementations, agent software instance 535, 545, 550 can be any other type of software usable for facilitating the communication and movement of data between provider environment 510 and external applications, data sources, and services of or otherwise associated with customer environment 530. In some implementations, agent software, such as one of agent software instance 535, agent software instance 545, or agent software instance 550, can include multiple agent software applications executed in customer environment 530. In some implementations, decrypting a new password by agent software instance 535 as part of a password reset request can include agent software instance 535 retrieving data associated with the password reset request from database 525 through platform instance 520. For example, agent software instance 535 can communicate instructions to devices and/or software of provider environment 510 (e.g., through router device 515) for allowing the devices and/or software of provider environment 510 to transmit data to agent software instance 535. In some implementations, the instructions can be processed in connection with platform instance 520 to grant access privileges for agent software instance 535 to platform instance 520 (and/or router device 515). As another example, agent software instance 535 can communicate instructions to provider environment 510 for directing platform instance 520 to query database 525 for an output message database table indicating the encrypted password associated with the password reset request and the public key used for encrypting the password.

In some implementations in which an ephemeral symmetric key is used to encrypt a request having a large size, agent software instance 535 can decrypt the public key encrypted-ephemeral symmetric key as part of decrypting the request. For example, the public key encrypted-ephemeral symmetric key can be concatenated to the same symmetric key-encrypted request when transmitted from client device 505. Agent software instance 535 can receive the encrypted request and parse the public key encrypted-ephemeral symmetric key from the ephemeral symmetric key-encrypted request. Agent software instance 535 can decrypt the public key encrypted-ephemeral symmetric key using the private key corresponding to the public key. Agent software instance 535 can then decrypt the ephemeral symmetric key-encrypted request using the decrypted ephemeral symmetric key.

In some implementations, customer environment 530 can be segmented into multiple network segments. In some implementations, agent software instance 535 can be a first agent software in direct communication with provider environment 510 (e.g., via router device 515), wherein other agent software instance 545, 550 within customer environment 530 can receive data from agent software instance 535 for facilitating password resets in other network segments of customer environment 530. In some implementations, agent software in multiple segments of customer environment 530 can each be in direct communication with devices of provider environment 510. For example, two or more of agent software instance 535, 545, 550 can directly receive data for processing the password reset request from router device 515. In some implementations, devices of provider environment 510 can communicate the encrypted password and associated data (e.g., an AES key, such as AES128, used to encrypt the password, wherein the AES key can be encrypted using the corresponding public key) to multiple agent software within some or all network segments of customer environment 530. For example, in addition to agent software instance 535 receiving the encrypted password and associated data, one or both of agent software instance 545, 550 can also or instead receive same.

In some implementations, the different key can be an ephemeral symmetric key generated using an encryption algorithm, for example, AES (e.g., AES-128) or 3DES. In some implementations, LDAP server 540 can be a directory system agent configured to receive the password encrypted using the negotiated new key from agent software instance 535 (or 545, 550), decrypt it using the negotiated new key, and hash and store the decrypted password in a database. In some implementations, LDAP server 540 can integrate with external directory systems, for example, Microsoft Active Directory, Novell, Domino, Open LDAP, or the like. In some implementations, each segment of customer environment 530 can have a dedicated LDAP server. In some implementations, a single LDAP server can be shared between one or more segments of customer environment 530.

Other implementations of public key cryptography may be used for securely communicating the password reset request throughout system 500. For example, a Diffie-Hellman key exchange can be used to implement full end-to-end encryption between the web browser executed on client device 505 and agent software instance 535, 545, 550. In some implementations, unique private and public key pairs can be generated for each agent software instance 535, 545, 550 within customer environment 535, and public keys from each agent software instance 535, 545, 550 can be communicated to platform instance 520, which can use the public keys to encrypt a new password within the web browser executed on client device 505 or in platform instance 520, for example, after a plaintext version of the new password is received via router device 515.

Keys may be distributed for use with agent software instance 535, 545, 550. Key distribution may include installing or modifying agent software within a customer environment. In some implementations, a unique private and public key pair may be generated (e.g., using RSA 2048) on a device within customer environment 530 and may be encrypted using a password based encryption. For example, keys may be generated and encrypted in response to input, such as user input, such as input received from an authorized user of customer environment 530 (e.g., a user having authority to install agent software within customer environment 530) via a user interface. The encrypted key pair may be transmitted, such as in response to user input, to platform instance 520 from the device within customer environment 530. The device within customer environment 530 can connect to a host, for example, by using RDP or SSH to connect to a Windows® OS virtual machine, within customer environment 530 to install the new agent software instance on the host. The agent software instance may be configured, such as in response to user input, based on platform instance 520, for example, with a URL associated with platform instance 520 and a username and password for accessing platform instance 520. The agent software instance can access platform instance 520 (e.g., via router device 515) using the provided configuration information to acquire the encrypted private and public key pair. In some implementations, the agent software instance can acquire the encrypted private and public key pair by sending a message to platform instance 520 indicating a request for platform instance 520 to transmit the encrypted private and public key pair to the agent software instance. In some implementations, the agent software instance can acquire the encrypted private and public key pair by copying the encrypted private and public key pair stored by platform instance 520. In some embodiments, an encrypted key pair may be decrypted using password used to encrypt the key pair, such as a password received in response to user input. The agent software instance can store the decrypted key pair and password within a data structure associated with the agent software instance and may transmit the decrypted public key to platform instance 520. This process can be repeated for installing multiple agent software instances within customer environment 530. In some implementations, platform instance 520 can verify that each agent software instance installed in customer environment 530 has the same public key and can store the public key in database 525.

In some embodiments, agent software may be installed, and keys may be distributed, within a customer environment that includes previously installed agent software. For example, each agent software instance executed in customer environment 530 can include a public and private key pair unique to that agent software. In some implementations, a first agent software instance may encrypt its private and public key pair using the public key of a second agent software instance, wherein the public key of the second agent software instance can be transmitted to the first agent software instance via platform instance 520. Key distribution may then be used to distribute the encrypted private and public key of the first agent software instance to the second agent software instance via platform instance 520. The second agent software instance may use its private key to decrypt the encrypted private and public key pair of the first agent software instance. This process can be repeated for other agent software instances installed within customer environment 530.

In some implementations, a key distribution unit can be used to distribute private and public keys between agent software instance 535, 545, 550 executed in customer environment 530. In some implementations, the key distribution unit can include instructions executable by a processor of a customer device within customer environment 530. For example, a customer device may acquire, or download, the key distribution unit from platform instance 520, such as in response to user input. In some embodiments, user credentials, such as credentials received by the customer device in response to user input, may be authenticated by the key distribution unit.

In some implementations, the key distribution unit can include instructions for verifying that each agent software instance from which a public key is received is authentic and valid (e.g., authorized by a system administrator of customer environment 530), for example, based on IP addresses or other data, such as a MAC addresses, associated with host devices on which the agent software is installed. In some implementations, the authorization of user credentials may be delayed or prevented until the agent software instance is authenticated using the key distribution unit. In some implementations, the key distribution unit may retrieve a list of public keys associated with the agent software instance executed within customer environment 530. In some implementations, the list of public keys can be acquired by, or downloaded to, platform instance 520. In some implementations, retrieving the list of public keys can include agent software instance 535, 545, 550, generating unique private and public key pairs, and transmitting the public keys to platform instance 520.

The key distribution unit may generate a private and public key pair, which may be encrypted using the public key of respective agent software instances within customer environment 530. In some implementations, the private and public key pair can be generated using a third party tool, such as OpenSSL. In some implementations, the encrypted key pair can be transmitted to platform instance 520, and may be transmitted from platform instance 520 to an agent software instance executed in customer environment 530 (e.g., using transport encryption established between the agent software instance and router device 515). In some implementations, receiving the encrypted key pair from platform instance 520 by an agent software instance can include the agent software instance transmitting a request for a message stored in database 525. The request for the message can be received by platform instance 520, which can process the message by retrieving the message from database 525, for example, by running a query or query set against database 525. The retrieved message can be transmitted to the agent software instance via router device 515. In some implementations, the agent software instance can decrypt the key pair using a private key unique to the agent software instance and store the decrypted key pair in a data structure associated with the agent software instance for later use. In some implementations, an agent software instance can verify that the key pair is successfully decrypted and stored by transmitting the decrypted public key to platform instance 520 (e.g., using a transport encryption). In some implementations, the key distribution unit can be specific to provider environment 510 or platform instance 520.

In some implementations, the key distribution unit may be omitted and key distribution may be implemented by, for example, the agent software. For example, an agent software instance, which may be the first agent software instance to execute within customer environment 530, may connect to platform instance 520, generate a unique public and private key pair, and transmit the key pair to other agent software instances executed within customer environment 530, either concurrently or subsequently.

In some implementations, a first agent software instance may connect to platform instance 520 and generate a first unique public and private key pair, and a second agent software instance may then connect to platform instance 520 and generate a second unique public and private key pair. The first agent software instance may retrieve the public key of the second unique public and private key pair and use it to encrypt the first unique public and private key pair. The first agent software instance may then transmit the encrypted first unique public and private key pair to the second agent software instance. In some implementations, the second agent software instance can decrypt the encrypted key pair using the second private key and can store the decrypted first key pair. In some implementations, this process can be repeated for each new agent software instance that connects to platform instance 520.

In some implementations, an agent software instance can transmit its encrypted public and private key pair to another agent software instance via platform instance 520. For example, platform instance 520 can receive the public key from the first agent software instance in response to a request for the public key and can transmit the received public key to another agent software instance. As another example, platform instance 520 can receive an encrypted version of the public and private key pair (e.g., encrypted using a key within customer environment 530) from the first agent software instance and transmit the encrypted key pair to the other agent software instance. In some implementations, key distribution can use a secondary public and private key pair generated within customer instance 530. For example, before a first agent software instance executes on a device of customer instance 530, an authorized user of customer instance 530 can generate a secondary key pair. Each agent software instance that operates within customer instance 530 can have access to the secondary key pair. When a new agent software instance connects to platform instance 520, the public key of the secondary key pair can be used to encrypt a unique public and private key pair of the first connected agent software instance. The new agent software instance can receive the encrypted key pair, for example, via platform instance 520 as described above, and decrypt the encrypted key pair using the secondary private key corresponding to the secondary public key used to encrypt the key pair.

Figure 6:
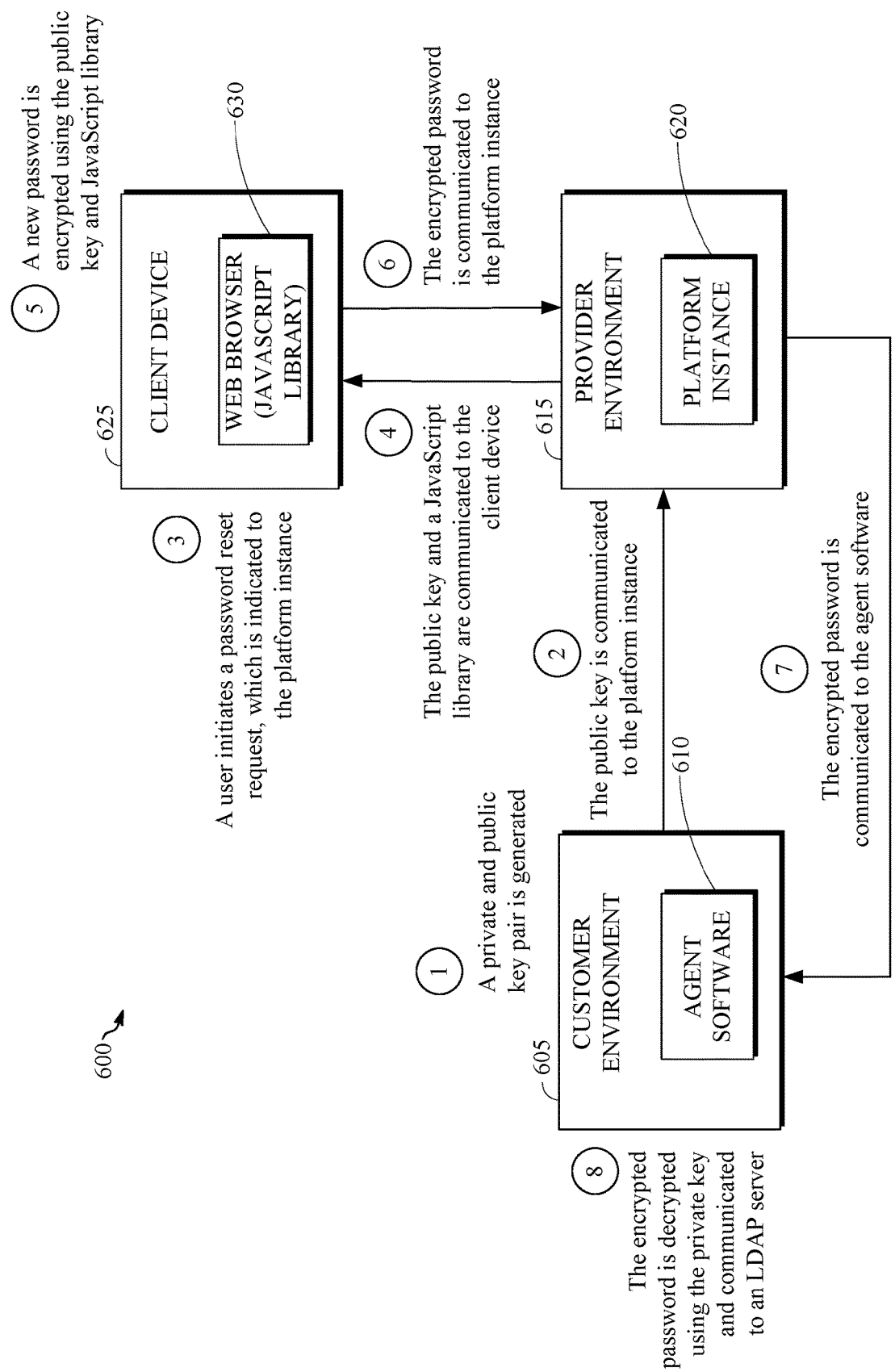
FIG. 6 is a diagram of an implementation of system for securely communicating a request within a computing infrastructure.

FIG. 6 is a diagram of an implementation of a system for securely communicating a request within a computing infrastructure 600. In some implementations, computing infrastructure 600 can include a client device 625 in communication with devices, software, or a combination thereof of a provider environment 615, and may implement a customer environment 605, which may include high availability processing. In some implementations, the communication of data between devices of customer environment 605 and devices of provider environment 615 or devices of provider environment 615 and client device 625 can include using transport encryption (e.g., SSL or TLS) to protect the data from eavesdroppers. Although the FIG. 6 shows elements of securely communicating a request within computing infrastructure 600 in an order, some elements may be performed in other orders, or concurrently. Some elements may be omitted, and other elements, not shown, may be included in addition to, or instead of, the elements shown. Although FIG. 6 refers to implementations for using computing infrastructure 600 for securely communicating requests, the implementations can be implemented as a series of operations comprising a method for securely communicating requests, as a computer readable medium comprising instructions executable for securely communicating requests, or the like.

Although implementations are described herein with respect to securely communicating a password reset request, other communications, messages, or requests can be securely communicated using implementations of the present disclosure. For example, computing infrastructure 600 can be used in connection with the secure communication of requests to load an access-restricted web application implemented by a customer of a platform service provider, requests to view customer content using tokens for authenticating users having sufficient privileges for the viewing, requests to submit sensitive or private information (e.g., credit card information, social security numbers, etc.), requests to submit financial information (e.g., bank routing numbers for employee paychecks), requests for password resets using elements of third party provider environments (e.g., Azure Web Services, Amazon EC2, etc.) in place of an LDAP server, or the like.

In some implementations, an agent software instance 610 installed within customer environment 605 can generate a key pair for asymmetric key cryptography. In some implementations, the key pair can include a public key and a private key. In some implementations, the public key may be communicated to various devices and/or software within computing infrastructure 600. For example, the public key may be transmitted to client device 625 for encrypting a request using web browser 630. In some implementations, the private key can be stored at agent software instance 610 and may be prevented from being communicated outside of customer environment 605. For example, the private key may be inaccessible by provider environment 615 or client device 625. In some implementations, agent software instance 610 can store the private key in a storage associated with a corresponding network segment of customer environment 605. In some implementations, the storage may be accessible by agent software instance 610 and may be incapable otherwise. In some implementations, the public key can be communicated to platform instance 620, for example, within a key message. In some implementations, platform instance 620 can store the key message (e.g., the public key) in a database included within, or otherwise associated with, provider environment 615 (e.g., a database node associated with an application node on which platform instance 620 is implemented). For example, the key message can be stored as an input message within a database table (e.g., a system properties or agent properties table).

In some implementations, a password reset request may be initiated, such as in response to user input received at client device 625, to reset, which may include generating, changing, or replacing, a password, such as a password that may be used, for example, to authenticate user credentials (e.g., of active directory, single sign-on, web account, or the like) within provider environment 615 or a third party provider environment (e.g., Azure or Amazon Web Services), or resources of the customer network associated with customer environment 605.

In some implementations, initiating the password reset request at client device 625 may include transmitting a request representative of the password reset request to platform instance 620. For example, a processor of client device 625 can execute a web browser 630 which may present an interface for accessing platform instance 620. Access to some aspects or features of the platform instance 620 may be prevented, and may be granted based on user credential authentication. In some embodiments, a password reset may be initiated to replace a lost, expired, or compromised password, or for any other reason. In some implementations, a password reset request may be generated and transmitted in response to input, such as user input indicating a request to initiate a password reset.

In response to user input (e.g., clicking on a "Forgot Password?" link) initiation data may be communicated to platform instance 620 indicating that the password reset request has been initiated. In some implementations, other credential authentication information may be received. For example, input, such as user input, may be received indicating one or more answers to security questions or otherwise uniquely identifying a user or account, and the password reset request may be indicated to platform instance 620 in response to validating the input. In some implementations, communications between client device 625 and devices and software within provider environment 615 can be routed through a load balancer. In some implementations, one or more individual requests can be transmitted together from client device 625 to provider environment 615 as a group of requests.

In some implementations, in response to the password reset request being indicated to or otherwise received by platform instance 620, platform instance 620 can communicate to client device 625 a response including the public key generated by agent software instance 610 along with an encryption library usable for encrypting a password using the public key (e.g., using an RSA encryption algorithm). In some implementations, the password can be generated based on input, such as user input, received by client device 625. In some implementations, the password can be assigned to the user of client device 625, for example, using a random string generator algorithm included in the JavaScript library used by web browser 630. The password can be encrypted using the public key and asymmetric key cryptography encryption library communicated from platform instance 620. In some implementations, the password can be encrypted within web browser 630. In some implementations, the password can be temporally locally saved as a file on client device 625, and the locally saved file can be encrypted using the public key and encryption library (e.g., outside of web browser 630).

In some implementations, in response to the password being encrypted, the encrypted password can be communicated to platform instance 620, for example, as a second response (e.g., wherein the first response indicated the initiation of the password reset process). Platform instance 620 can store the encrypted password in a database included within, or otherwise associated with, provider environment 615. In some implementations, the database can include tables of input and output messages representative of data processed in connection with platform instance 620. In some implementations, platform instance 620 can store the encrypted password along with the public key used to encrypt it or data indicating the public key, such as a pointer to the table, row, and column in which the public key is stored.

Data associated with the encrypted password can be communicated within an agent message to agent software instance 610 for decryption and further processing of the password reset request. In some implementations, agent software instance 610 can retrieve the data stored in connection with the encrypted password from platform instance 620. For example, agent software instance 610 can transmit a request, such as periodically, to platform instance 620 to indicate, for example, using a flag, whether password data has been received by platform instance 620 in connection with a password reset request. In some implementations, communicating the agent message to agent software instance 610 can include a server device implementing platform instance 620 within provider environment 615 transmitting the agent message to a customer device in customer environment 605, wherein agent software 610 is executed on the customer device. In some implementations, the customer device can be a server device controlled by the customer associated with customer environment 605.

In some implementations, customer environment 605 may be separate from provider environment 615, and security measures may be implemented for preventing provider devices within provider environment 615 (e.g., the router device) from accessing agent software instance 610, and agent software instance 610, or a customer device within customer environment 605, may grant access. In some implementations, transmitting, or otherwise communicating, the agent message to agent software instance 610 can include agent software instance 610 transmitting, or otherwise communicating, a request to provider environment 615 (e.g., through a router device).

In some implementations, provider environment 615 can respond to the request from agent software 610 by transmitting, or otherwise communicating data, such as an agent message, to agent software 610. For example, transmitting the request by agent software 610 can include creating a connection between customer environment 605 and provider environment 615 for allowing agent software 610 to communicate the request outside of customer environment 605. A server device of provider environment 615 can receive the request (e.g., through a router device) and transmit the request to an application node on which platform instance 620 is implemented. Provider environment 615 can transmit a response to the request using the connection opened in response to the request. In some implementations, the connection may be closed after transmitting the response by provider environment 615.

In some implementations, transmitting the request by agent software 610 to a device within provider environment 615 can include agent software 610 granting privileges to provider environment 615 to access agent software 610, for example, for the limited purpose of transmitting the agent message. For example, agent software 610 can grant the privileges to provider environment 615 by opening a port in customer environment 605 for receiving data from a server device of provider environment 615 based on an IP address of the server device. In some implementations, the request transmitted by agent software instance 610 can include instructions for causing platform instance 620 to query the database for the encrypted data to be included in the agent message.

In some implementations, a request from agent software instance 610 or other devices or software within customer environment 605 may be omitted, and provider environment 615 can communicate the agent message to agent software instance 610 within customer environment 605. For example, a device within provider environment 615 can initiate a connection with a device implementing agent software 610, such as using another security mechanism, such as a VPN or secured interface to customer environment 605.

In some implementations, in response to the agent message including the encrypted password data being communicated to agent software instance 610, agent software instance 610 can decrypt the agent message using a private key. In some implementations, the private key used by agent software instance 610 to decrypt the agent message can be associated with the public key used during the encryption. In some implementations, in response to decrypting the encrypted password using the private key, agent software instance 610 can have access to the un-encrypted version of the password (e.g., in plaintext form). In some implementations, in response to agent software instance 610 decrypting the password using the private key, the password can be communicated by agent software 610 to an LDAP server within, or otherwise associated with, customer environment 605. In some implementations, communicating the password by agent software instance 610 to the LDAP server can include agent software 610 instance re-encrypting the password using a key (e.g., a unique ephemeral symmetric key using AES-128 or 3DES) negotiated with the LDAP server and communicating the re-encrypted password to the LDAP server using LDAP over SSL. In some implementations, the LDAP server can hash and store the password in an associated database, for example, by indicating the password as the password for future system access by the corresponding user, device, or account. In some implementations where the password may be re-encrypted by agent software instance 610 before it is communicated to the LDAP server, and the LDAP server can decrypt the password using the negotiated key before hashing and storing it.

Implementations for securely communicating requests can include steps other than those shown in FIG. 6. In some implementations, communicating the public key to provider environment 615 may be omitted. For example, the public key may be stored at agent software instance 610, and, in response to platform instance 620 receiving an indication that a password reset request process has been initiated, such as in response to input received from a user of client device 630, a device or software within provider environment 615 can transmit instructions (or direct customer environment 605 to transmit instructions) for receiving the public key. In some implementations, the instructions may include information usable for accessing the customer environment 605 using, for example, a virtual private network (VPN). In some implementations, devices or software within provider environment 615 may not have access to the VPN or other information used to retrieve the public key from customer environment 605. As another example, the public key may be transmitted by agent software instance 610 to a secure third-party host, wherein the instructions communicated to client device 630 can include information for accessing the public key on the third-party host.

Implementations of the present disclosure can be used for communicating requests other than password reset requests. For example, computing infrastructure 600 can be used to securely transmit sensitive information, such as a credit card number, social security number, bank account routing number, etc., from client device 625 to a device implementing agent software instance 610 in customer environment 605 via devices and software within provider environment 615. In some implementations, a request including the sensitive information can be encrypted using a public key using web browser 630, and agent software instance 610 can thereafter decrypt the public key encrypted request using a private key of the agent software instance 610. Agent software instance 610 can transmit the decrypted sensitive information to a server device within provider environment 615 using transport encryption, such as SSL or TLS. In some implementations, agent software instance 610 can also, or instead, transmit the decrypted sensitive information to devices and/or software within a different provider environment (e.g., Workday®) using transport encryption, such as SSL or TLS. In some implementations, securely communicating requests, as described herein, can be utilized for securely communicating a password reset request to devices and/or software within a different provider environment, wherein the password may be decrypted by agent software instance 610 (e.g., to Amazon Web Services or Azure), prior to transmission, for example, for service orchestration and management.

The steps, or operations, of any method, process, or algorithm described in connection with the embodiments disclosed herein may be embodied directly in hardware, firmware, software executed by hardware, circuitry, or a combination thereof.

Figure 7:
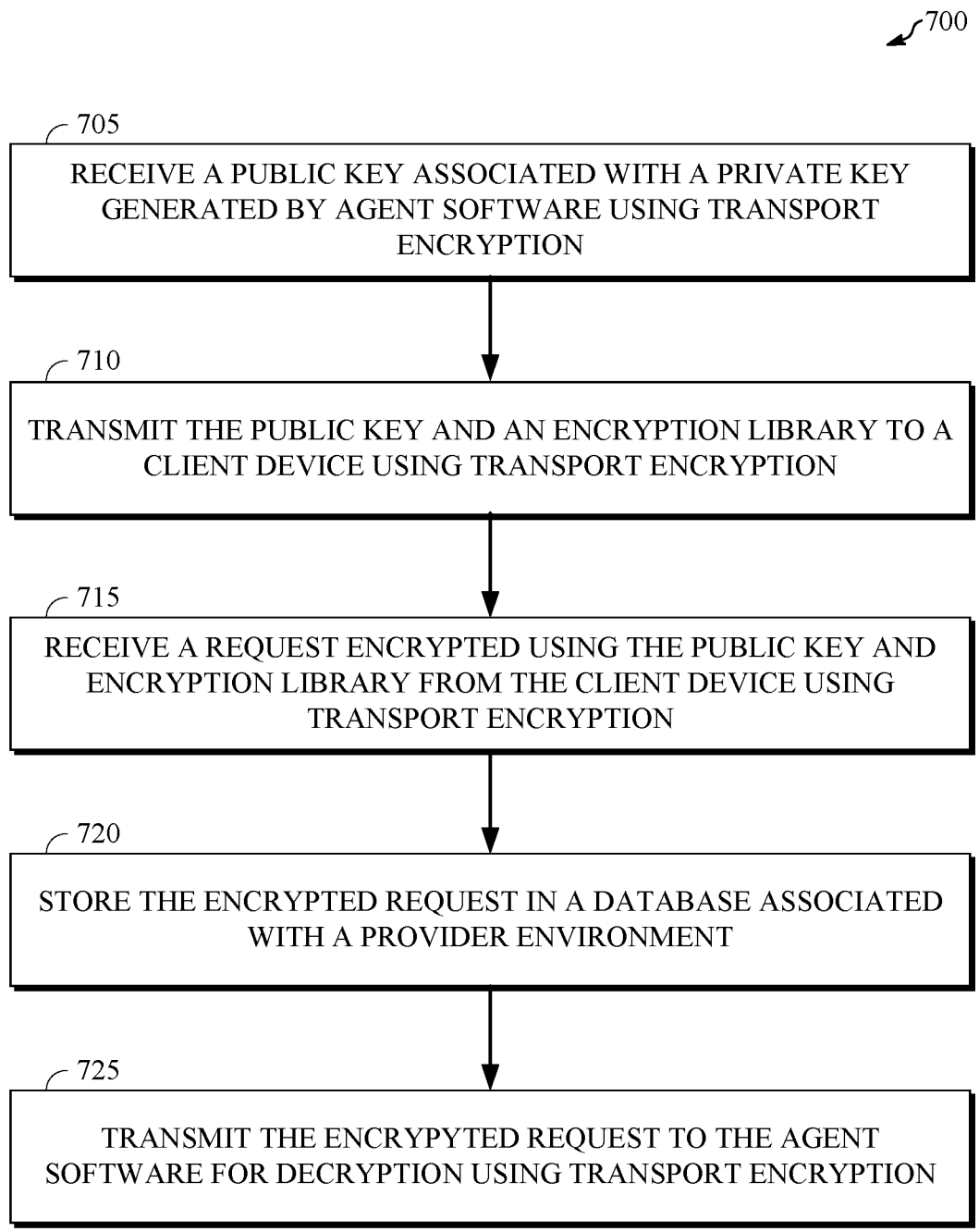
FIG. 7 is a flowchart of an implementation of a method for securely communicating a request from a client device to a device of a customer environment via an intermediate provider environment.
Figure 8:
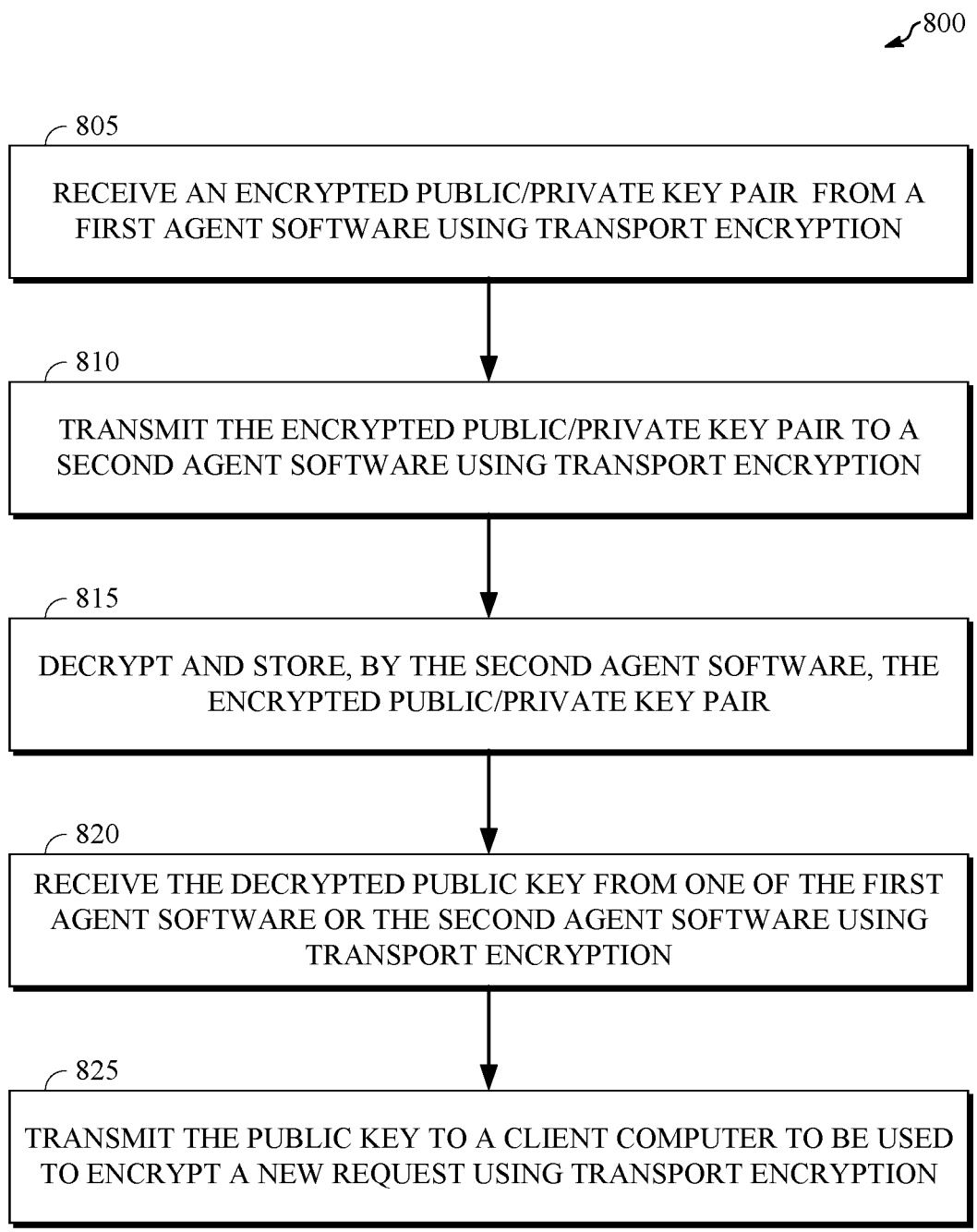
FIG. 8 is a flowchart of an implementation of a method for provisioning keys for securely communicating a request within a computing infrastructure.

FIGS. 7 and 8 show examples of methods 700 and 800 for securely communicating password reset requests within a computing infrastructure, such as computing system 100 of FIG. 1. In some implementations, method 700, 800, or both, may be executed using computing devices, such as the equipment of FIGS. 1, 2, and 3. In some implementations, method 700, 800, or both, may be performed, for example, by executing a machine-readable program or other computer executable instructions, such as instructions or programs described according to JavaScript, C, or other such instructions.

Although methods 700 and 800 are shown as a series of operations for clarity, the aspects of the systems and methods described herein may be performed in various orders and/or concurrently. Additionally, operations in accordance with this disclosure may be performed with other operations not presented and described herein. Furthermore, one or more aspect of the systems and methods described herein may be omitted. Although FIGS. 7 and 8 are described as including securely communicating a password reset request within a computing infrastructure, other types of requests can be securely communicated using the implementations of methods 700 and 800. For example, methods 700 and 800 can be used in connection with the secure communication of requests to load an access-restricted web application implemented by a customer of a platform service provider, requests to view customer content using tokens for authenticating users having sufficient privileges for the viewing, or the like.

FIG. 7 is a flowchart of an implementation of a method 700 for securely communicating a request from a client device to a device of a customer environment via an intermediate provider environment.

Securely communicating a request 700 may include receiving a public and private key pair by a device of a provider environment from agent software installed on a customer device in a customer environment at 705. In some implementations, receiving by the device of the provider environment may include using transport encryption, such as TLS, for connecting an application executed on a device in the provider environment with an agent software instance. In some implementations, the public and private key pair can be generated by the agent software instance, for example, in response to input receive from a system administrator operating the agent software. In some implementations, prior to the provider environment receiving the public key from the agent software instance, the public and private key pair can be provisioned to multiple agent software instances within the customer environment. In some embodiments, it may be verified that each, or at least some, agent software instance includes the public key. An implementation of a method for provisioning the private and public key pair is shown in FIG. 8.

In some implementations, and as used herein, transmitting, receiving, or otherwise communicating data using transport encryption can include sending, receiving, or both, the data through an encrypted link between applications (e.g., a web browser executing on a client device, agent software installed in a customer environment, a platform instance implemented on a provider environment, a directory service implemented within the customer environment, or the like) or otherwise using an encryption protocol in connection with communicating data between linked applications.

In some implementations, the transport encryption can be an application layer protocol for securely communicating the data, for example, SSL or TLS. In some implementations, communications using transport encryption between the provider environment and the client device or the customer environment can be directed through, or otherwise processed via, a router device (e.g., a load balancer) within, or otherwise associated with, the provider environment.

In some implementations, the communication of multiple data can refer to communications occurring simultaneously or at times proximate to one another. For example, the communication of a public key and an encryption library (e.g., a JavaScript library) by a provider environment to a client device can include packaging and communicating the public key and encryption library together, the public key and JavaScript being individually but simultaneously communicated, or the public key and encryption library being communicated individually and at different times (e.g., within milliseconds, seconds, or other units of time measurement of one another).

In some embodiments, a platform instance associated with the agent software instance (e.g., a platform instance implemented in connection with the customer environment in which the agent software is installed) may receive the public key from the agent software instance, and may store the public key in a database. In some implementations, the provider environment may receive initiation data indicative of a group of requests imitated in response to user input (e.g., by the platform instance receiving data representative of correct answers to security questions used to reset the user's password), and devices and/or software of the provider environment may communicate the public key to the client device for use in encrypting a password generated by or otherwise assigned to the user or account at 710. In some implementations, communicating the public key to the client device can include transmitting the public key along with the encryption library usable for encrypting the password using the public key (e.g., for RSA encryption) using transport encryption.

In some implementations, the password encrypted by the client device (e.g., within a web browser executed on the client device), can be received within the provider environment from the client device using transport encryption at 715. In some implementations, the public key and/or encryption library used for encrypting the password can be communicated along with the encrypted password.

In some implementations, the encrypted password (and other data communicated along with it) can be processed at operation 720. For example, the encrypted password can be sent by a router device of the provider environment to a server device on which a platform instance is implemented. The platform instance can store the encrypted password within a database. In some implementations, the encrypted password can be stored in a database table that includes the public key used to encrypt the password or a pointer to the public key within another table of the database.

In some implementations, the platform instance can receive a request from the agent software instance for the encrypted password stored in the database. In some implementations, the request from the agent software instance can include instructions executable by a processor of a device of the provider environment for querying the database for the encrypted password. In some implementations, the request can further include instructions for querying other data stored in the database that is associated with the encrypted password, such as the public key. In some implementations, the request and/or other communication used for preparing the encrypted password for communication to the agent software instance can include using transport encryption, such as TLS.

In some implementations, at operation 725, the encrypted password, associated data, or both, can be communicated using a transport encryption between the provider environment and the agent software instance. In some implementations, the encrypted password, associated data, or both, can be transmitted by the provider environment as an agent message to be received by the agent software instance. In some implementations, the platform instance implemented on the provider environment may retrieve the requested data from the database, package the retrieved data, and transmit the packaged data to the agent software instance through a router device using transport encryption, such as TLS.

In some implementations, the agent software instance can transmit instructions for allowing a device or software of the provider environment (e.g., through a router device) to access the agent software instance so that the provider environment can transmit the agent message (e.g., the encrypted password) to the agent software. Once the agent message is received by the agent software instance from the device or software of the provider environment, the agent software instance can decrypt the password included in the agent message using the private key it generated in association with the public key to encrypt the password. In some implementations, the public key may be communicated, along with the encrypted password, to the agent software instance, and the agent software instance or a device on which the agent software instance is implemented can compare the received public key with the public key it generated in association with the corresponding private key before decrypting the password using the private key. For example, the device on which the agent software instance is implemented can execute a diffing tool for comparing the received and generated public keys. The agent software instance can use the decrypted password to fulfill the password reset request, for example, by re-encrypting the password using a key negotiated with an LDAP server in the customer environment and communicating the re-encrypted password to the LDAP server using transport encryption (e.g., TLS) to be decrypted, hashed, and stored.

FIG. 8 is a flowchart of an implementation of a method 800 for provisioning keys for securely communicating a request within a computing infrastructure.

Method 800 may include receiving a key password and an encrypted key pair by a provider environment from a first agent software instance installed in a customer environment at 805. In some implementations, the encrypted key pair can be transmitted by the first agent software instance as a first provisioning message to be received by the provider environment. The key pair can include a public key and a private key, which can be generated by the first agent software instance. In some implementations, receiving an encrypted key pair at 805 can include transmitting the encrypted key pair to a platform instance implemented on the provider environment. In some implementations, the communication of the encrypted key pair may include using transport encryption, such as TLS.

In some implementations, the provider environment can communicate the encrypted key pair to a second software agent instance installed in the customer environment at 810.

In some implementations, the encrypted key pair can be transmitted by the provider environment as a second provisioning message to be received by the second agent software instance. In some implementations, the customer environment may be segmented, and the first agent software instance and second agent software instance can be installed in different network segments of the customer environment.

In some implementations, communication of the encrypted key pair to the second software agent instance can include communicating the encrypted key pair to multiple software agents installed in the customer environment, wherein each software agent can be installed in a distinct network segment. In some implementations, the communication of the encrypted key pair to the second software agent may include using transport encryption, such as TLS.

In some implementations, the second agent software instance (or multiple agent software instances) that received the encrypted key pair at operation 810 can decrypt the key pair using a key password at 815, which, for example, can be a password used to encrypt public and private key pairs using an encryption algorithm such as AES (e.g., AES-128, wherein the password can be the 128-bit key). In some implementations, decrypting the encrypted key pair by the second (or multiple) agent software instance can include the second (or multiple) agent software instance storing the decrypted public key and private key in a data store associated with the second (or multiple) agent software installation(s).

In some implementations, the provider environment can receive the decrypted public key from an agent software instance installed in the customer environment at 820. In some implementations, the public key is received by a platform instance implemented on the provider environment, wherein the platform instance is associated with the agent software instance. In some implementations, the public key can be communicated to the platform instance from the agent software instance via a router device (e.g., a load balancer), wherein the communication can include using transport encryption, such as TLS. In some implementations, receiving the decrypted public key by the platform instance can include the platform instance storing, or causing to be stored, the public key within a database. In some implementations, operation 820 can correspond to operation 705 of method 700, for example, to prepare the provider environment for securely communicating a password reset request initiated in response to input received from a user of a client device.

In some implementations, the public key can be communicated by the provider environment to a client device in communication with the provider environment for encrypting a request (e.g., a password entered by a client device user during a password reset request) at 825. In some implementations, operation 825 can include the platform instance receiving an indication that a user of the client device has initiated the password reset request before communicating the public key to the client device, such as in response to input received from a user of the client device, a device or software within the provider environment can transmit instructions for receiving the public key. In some implementations, the provider environment can communicate an encryption library (e.g., a JavaScript library) usable for encrypting the password using the public key along with the public key. In some implementations, the communication of the public key and associated data may include using transport encryption, such as TLS. In some implementations, operation 825 can correspond to operation 710 of method 700, for example, for a password reset request using secure communications.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for securely communicating between a client device and a customer device of a customer environment via a computer communication network, the system comprising:
   a provider environment including a router device and a server device, the server device including a processor, a memory, and a network interface, wherein the memory includes instructions executable by the processor to cause the processor to:
      receive, from the client device, a first request comprising a password reset request;
      transmit, in response to receiving the first request from the client device, an encrypted response including an encryption library and a public key to the client device, wherein the encrypted response is encrypted using transport encryption established between the router device and the client device;
      receive, from the client device, an encrypted request including a reset password encrypted by the client device using the public key and the encryption library, wherein the encrypted request is also encrypted using transport encryption established between the client device and the router device;
      receive, from agent software executed on the customer device in the customer environment, an encrypted second request for an encrypted agent message, wherein the encrypted second request includes instructions to open a port of the provider environment, the encrypted second request is encrypted using transport encryption established between the router device and the agent software, and the router device is prevented from transmitting the encrypted agent message to the agent software unless the port is open; and
      transmit the encrypted agent message to the agent software, the encrypted agent message including the reset password, wherein the encrypted agent message is encrypted using transport encryption established between the router device and the agent software, and the encrypted agent message is decryptable by the agent software to extract the reset password using a private key that is part of a key pair with the public key, wherein the provider environment does not have access to the private key and cannot decrypt the reset password that is sent between the customer environment and the client device via the provider environment, wherein the reset password is used to authenticate user credentials within the provider environment.

2. The system of claim 1, wherein the instructions executable by the processor include instructions executable by the processor to cause the processor to:
   receive, from the agent software, an encrypted key message including the public key, wherein the encrypted key message is encrypted using transport encryption established between the router device and the agent software; and
   receive, from the client device, the first request including a request for the public key, wherein the first request is encrypted using transport encryption established between the client device and the router device.

3. The system of claim 1, wherein the customer environment includes a first network segment and a second network segment, the agent software includes a first agent software and a second agent software, the first network segment includes the first agent software and the second network segment includes the second agent software, and the instructions executable by the processor include instructions executable by the processor to:
   receive, from the first agent software, a first provisioning message including an encrypted key pair, wherein the encrypted key pair includes an encrypted version of the key pair, and wherein the encrypted key pair is encrypted using a key password, the first provisioning message is encrypted using transport encryption established between the first agent software and the router device;
   transmit a second provisioning message including the encrypted key pair to the second agent software, wherein the second provisioning message is encrypted using transport encryption established between the router device and the second agent software, and the encrypted key pair is decryptable by the second agent software using the key password; and
   receive, in response to the second provisioning message, a key message including the public key from one of the first agent software or the second agent software, wherein the key message is encrypted using transport encryption established between the one of the first agent software or the second agent software and the router device.

4. The system of claim 1, wherein the instructions executable by the processor include instructions executable by the processor to cause the processor to store the encrypted request in a database associated with the server device prior to the processor executing the instructions to transmit the encrypted agent message to the agent software.

5. The system of claim 4, wherein the instructions executable by the processor to cause the processor to:
   store the encrypted request include instructions executable by the processor to store the encrypted request on a condition that the database includes a staleness rule; and
   remove data stored in the database for longer than a staleness period based on the staleness rule.

6. The system of claim 1, wherein the instructions executable by the processor include instructions executable by the processor to cause the processor to transmit the encrypted response on a condition that the agent software generated the public key and the private key.

7. The system of claim 1, wherein the transport encryption includes a Transport Layer Security protocol or a Secure Sockets Layer protocol.

8. A method for securely communicating between a client device and a customer device of a customer environment via a computer communication network, the computer communication network including a provider environment, the provider environment including a router device and a server device, the method comprising:
- receiving, from the client device, a first request comprising a password reset request;
- transmitting, in response to receiving the first request from the client device, an encrypted response including an encryption library and a public key to the client device, wherein the encrypted response is encrypted using transport encryption established between the router device and the client device;
- receiving, from the client device, an encrypted request including a reset password encrypted by the client device using the public key and the encryption library, wherein the encrypted request is also encrypted using transport encryption established between the client device and the router device;
- receiving, from agent software executed on the customer device in the customer environment, an encrypted second request for an encrypted agent message, wherein the encrypted second request includes instructions to open a port of the provider environment, the encrypted second request is encrypted using transport encryption established between the agent software and the router device, and the router device is prevented from transmitting the encrypted agent message to the agent software unless the port is open;
- transmitting the encrypted agent message to the agent software, the encrypted agent message including the reset password, wherein the encrypted agent message is encrypted using transport encryption established between the router device and the agent software, and the encrypted agent message is decryptable by the agent software to extract the reset password using a private key that is part of a key pair with the public key, wherein the provider environment does not have access to the private key and cannot decrypt the reset password that is sent between the customer environment and the client device via the provider environment, wherein the reset password is used to authenticate user credentials within the provider environment.

9. The method of claim 8, the method further comprising:
- receiving, from the agent software, an encrypted key message including the public key, wherein the encrypted key message encrypted is using transport encryption established between the agent software and the router device; and
- receiving, from the client device, the first request including a request for the public key, wherein the first request is encrypted using transport encryption established between the client device and the router device.

10. The method of claim 8, wherein the customer environment includes a first network segment and a second network segment, the agent software includes a first agent software and a second agent software, the first network segment includes the first agent software and the second network segment includes the second agent software, and the method comprises:
- receiving, from the first agent software, a first provisioning message including an encrypted key pair, wherein the encrypted key pair includes an encrypted version of the key pair, and wherein the encrypted key pair is encrypted using a key password, the first provisioning message is encrypted using transport encryption established between the first agent software and the router device;
- transmitting a second provisioning message including the encrypted key pair to the second agent software, wherein the second provisioning message is encrypted using transport encryption established between the router device and the second agent software, and the encrypted key pair is decryptable by the second agent software using the key password; and
- receiving, in response to the second provisioning message, a key message including the public key from one of the first agent software or the second agent software, wherein the key message is encrypted using transport encryption established between the one of the first agent software or the second agent software and the router device.

11. The method of claim 8, the method comprising:
- storing the encrypted request in a database associated with the server device prior to transmitting the encrypted agent message to the agent software.

12. The method of claim 11, the method comprising:
- storing the encrypted request on a condition that the database includes a staleness rule; and,
- removing data stored in the database for longer than a staleness period based on the staleness rule.

13. The method of claim 8, the method comprising transmitting the encrypted response on a condition that the agent software generated the public key and the private key.

14. The method of claim 8, wherein the transport encryption includes a Transport Layer Security protocol or a Secure Sockets Layer protocol.

15. Non-transitory, tangible, and computer-readable medium storing instructions that, when executed, are configured to cause one or more hardware processors of a provider environment to perform operations comprising:
- receiving, from the client device, a first request comprising a password reset request;
- transmitting, in response to receiving the first request from the client device, an encrypted response including an encryption library and a public key to the client device, wherein the encrypted response is encrypted using transport encryption established between the router device and the client device;
- receiving, from the client device, an encrypted request including a reset password encrypted by the client device using the public key and the encryption library, wherein the encrypted request is also encrypted using transport encryption established between the client device and the router device;
- receiving, from an agent software executed on the customer device in the customer environment, an encrypted second request for an encrypted agent message, wherein the encrypted second request includes instructions to open a port of the provider environment, the encrypted second request is encrypted using transport encryption established between the agent software and the router device, and the router device is prevented from transmitting the encrypted agent message to the agent software unless the port is open;
- transmitting the encrypted agent message to the agent software, the encrypted agent message including the reset password, wherein the encrypted agent message is encrypted using transport encryption established between the router device and the agent software, and the encrypted agent message is decryptable by the agent software to extract the reset password using a private key that is part of a key pair with the public key, wherein the provider environment does not have access to the private key and cannot decrypt the reset password that is sent between the customer environment and the client device via the provider environment, wherein the reset password is used to authenticate user credentials within the provider environment.

16. The non-transitory, tangible, and computer-readable medium of claim 15, wherein the customer environment includes a first network segment and a second network segment, the agent software includes a first agent software and a second agent software, the first network segment includes the first agent software and the second network segment includes the second agent software, and the operations comprise:

receiving, from the first agent software, a first provisioning message including an encrypted key pair, wherein the encrypted key pair includes an encrypted version of the key pair, and wherein the encrypted key pair is encrypted using a key password, the first provisioning message is encrypted using transport encryption established between the first agent software and the router device;

transmitting a second provisioning message including the encrypted key pair to the second agent software, wherein the second provisioning message is encrypted using transport encryption established between the router device and the second agent software, and the encrypted key pair is decryptable by the second agent software using the key password; and receiving, in response to the second provisioning message, a key message including the public key from one of the first agent software or the second agent software, wherein the key message is encrypted using transport encryption established between the one of the first agent software or the second agent software and the router device.

17. The non-transitory, tangible, and computer-readable medium of claim 15, the operations comprise storing the encrypted request in a database associated with the server device prior to transmitting the encrypted agent message to the agent software.

18. The non-transitory, tangible, and computer-readable medium of claim 15, the operations comprise:

storing the encrypted request on a condition that the database includes a staleness rule; and removing data stored in the database for longer than a staleness period based on the staleness rule.

19. The non-transitory, tangible, and computer-readable medium of claim 15, the operations comprise transmitting the encrypted response on a condition that the agent software generated the public key and the private key.

20. The non-transitory, tangible, and computer-readable medium of claim 15, wherein the transport encryption includes a Transport Layer Security protocol or a Secure Sockets Layer protocol.

\* \* \* \* \*